(12) United States Patent
 Wakabayashi

(10) Patent No.: US 10,362,220 B2
(45) Date of Patent: Jul. 23, 2019

(54) CONVERSATION OF PIXEL DATA INTO COMPRESSION FORMAT OF PIXELS

(71) Applicant: SONY CORPORATION, Tokyo (JP)

(72) Inventor: Hayato Wakabayashi, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 56 days.

(21) Appl. No.: 14/646,940

(22) PCT Filed: Nov. 18, 2013

(86) PCT No.: PCT/JP2013/080978
§ 371 (c)(1),
(2) Date: May 22, 2015

(87) PCT Pub. No.: WO2014/084072
PCT Pub. Date: Jun. 5, 2014

(65) Prior Publication Data
US 2015/0312476 A1    Oct. 29, 2015

(30) Foreign Application Priority Data
Nov. 29, 2012  (JP) ................. 2012-261208

(51) Int. Cl.
*H04N 19/00* (2014.01)
*H04N 5/232* (2006.01)
(Continued)

(52) U.S. Cl.
CPC ..... *H04N 5/23229* (2013.01); *H04N 1/00209* (2013.01); *H04N 1/2112* (2013.01);
(Continued)

(58) Field of Classification Search
CPC .......... G06T 9/00–40; H04N 19/00–90; H04N 5/23229; H04N 5/232; H04N 5/335; H04N 1/00209; H04N 1/2112; H04N 1/42
See application file for complete search history.

(56) References Cited

U.S. PATENT DOCUMENTS

| | | | | |
|---|---|---|---|---|
| 5,995,553 A | * | 11/1999 | Crandall | G08B 25/085 375/272 |
| 2001/0013944 A1 | * | 8/2001 | Nagasawa | G06F 3/1294 358/1.14 |

(Continued)

FOREIGN PATENT DOCUMENTS

| JP | 2008-543203 A | 11/2008 |
|---|---|---|
| JP | 2009-130563 A | 6/2009 |

(Continued)

OTHER PUBLICATIONS

Nokia & ST Confidential. "SMIA 1.0 Part 2: CCP2 Specification." pp. iii, 12, 45-49.

*Primary Examiner* — Sean T Motsinger
(74) *Attorney, Agent, or Firm* — Chip Law Group

(57) ABSTRACT

The present technique relates to an image sensor, an data transmission method thereof, an information processing apparatus, an information processing method, an electronic device, and a program with which it is made possible to improve flexibility in compression and to make connectivity between an image sensor and a DSP better.
Data Pixel4*N to Pixel4*N+3 in a 12-bit original image data format of four pixels is converted into six-bit compression data and is arranged by two pixels into a 12-bit compression data format including a structure identical to that of a 12-bit original image data format, whereby data Data2*N and Data2*N+1 is configured. Moreover, upper eight bits of each of compression data formats Data2*N and Data2*N+1 are (Continued)

read and arranged into data Byte3*N and Byte3*N+1. Lower four bits of each of the compression data format Data2*N and Data2*N+1 are arranged into data Byte3*N+2. The present technique can be applied to an imaging apparatus.

12 Claims, 22 Drawing Sheets

(51) Int. Cl.
| | | |
|---|---|---|
| H04N 1/41 | (2006.01) | |
| H04N 5/335 | (2011.01) | |
| H04N 1/00 | (2006.01) | |
| H04N 1/21 | (2006.01) | |
| H04N 19/115 | (2014.01) | |
| H04N 19/154 | (2014.01) | |

(52) U.S. Cl.
CPC ............... *H04N 1/41* (2013.01); *H04N 5/232* (2013.01); *H04N 5/335* (2013.01); *H04N 19/115* (2014.11); *H04N 19/154* (2014.11)

(56) References Cited

U.S. PATENT DOCUMENTS

| | | | | |
|---|---|---|---|---|
| 2001/0030649 | A1* | 10/2001 | Mamiya | G09G 5/006 345/530 |
| 2004/0202375 | A1* | 10/2004 | Kalevo | H04N 19/50 382/239 |
| 2005/0238329 | A1* | 10/2005 | Hyodo | G11B 20/10527 386/338 |
| 2007/0242945 | A1* | 10/2007 | Fredlund | G03B 17/00 396/310 |
| 2008/0125030 | A1* | 5/2008 | Mantel | H04H 20/28 455/3.06 |
| 2009/0097764 | A1* | 4/2009 | Sung | H04N 19/172 382/239 |
| 2009/0278984 | A1* | 11/2009 | Suzuki | G09G 5/003 348/554 |
| 2009/0281425 | A1* | 11/2009 | Sasahara | H04N 19/124 600/443 |
| 2010/0119164 | A1* | 5/2010 | Singhal | G06F 19/321 382/233 |
| 2010/0229109 | A1* | 9/2010 | Miwa | G06F 17/30876 715/760 |
| 2010/0290536 | A1* | 11/2010 | Iwahashi | H04N 21/234327 375/240.25 |
| 2010/0309382 | A1* | 12/2010 | Matsubayashi | G09G 5/006 348/723 |
| 2012/0081577 | A1 | 4/2012 | Cote | |
| 2012/0124455 | A1* | 5/2012 | Koshisaka | H03M 13/2915 714/799 |
| 2013/0179746 | A1* | 7/2013 | Hamada | H04L 25/4908 714/748 |
| 2013/0227370 | A1* | 8/2013 | Hamada | H04L 1/0079 714/746 |
| 2014/0056516 | A1* | 2/2014 | Wee | G06T 9/00 382/166 |
| 2014/0321527 | A1* | 10/2014 | Inata | H04N 21/44209 375/240.01 |
| 2015/0312476 | A1* | 10/2015 | Wakabayashi | H04N 1/41 348/231.99 |

FOREIGN PATENT DOCUMENTS

| | | |
|---|---|---|
| JP | 2011-049901 A | 3/2011 |
| JP | 2012-054882 A | 3/2012 |

* cited by examiner

FIG. 7

| MAJOR ITEM | MINOR ITEM | INFORMATION AMOUNT | CONTENTS |
|---|---|---|---|
| FRAME INFORMATION | Frame Start | 1bit | INDICATION OF HEAD OF FRAME (SUCH AS FIRST LINE) |
| FRAME INFORMATION | Frame End | 1bit | INDICATION OF END OF FRAME (SUCH AS FRONT LINE OF REAR DUMMY) |
| LINE INFORMATION | Line Valid | 1bit | INDICATION OF EFFECTIVENESS/INVALIDITY OF LINE |
| LINE INFORMATION | Line Number | 13bit | INDICATION OF LINE NUMBER |
| OTHER | Reserved | 32bit | SECURED FOR EXPANSION IN FUTURE |
| OTHER | Header ECC | 18byte | ECC OF HEADER INFORMATION |

FIG. 8

| Byte | Bit | Contents |
|---|---|---|
| H7 | 63 | Frame Start |
| | 62 | Frame End |
| | 61 | Line Valid |
| | 60 | Line Number[12] |
| | 59 | Line Number[11] |
| | 58 | Line Number[10] |
| | 57 | Line Number[9] |
| | 56 | Line Number[8] |
| H6 | 55 | Line Number[7] |
| | 54 | Line Number[6] |
| | 53 | Line Number[5] |
| | 52 | Line Number[4] |
| | 51 | Line Number[3] |
| | 50 | Line Number[2] |
| | 49 | Line Number[1] |
| | 48 | Line Number[0] |

| Byte | Bit | Contents |
|---|---|---|
| H5 | 47 | Reserved[31] |
| | 46 | Reserved[30] |
| | 45 | Reserved[29] |
| | 44 | Reserved[28] |
| | 43 | Reserved[27] |
| | 42 | Reserved[26] |
| | 41 | Reserved[25] |
| | 40 | Reserved[24] |
| H4 | 39 | Reserved[23] |
| | 38 | Reserved[22] |
| | 37 | Reserved[21] |
| | 36 | Reserved[20] |
| | 35 | Reserved[19] |
| | 34 | Reserved[18] |
| | 33 | Reserved[17] |
| | 32 | Reserved[16] |

| Byte | Bit | Contents |
|---|---|---|
| H3 | 31 | Reserved[15] |
| | 30 | Reserved[14] |
| | 29 | Reserved[13] |
| | 28 | Reserved[12] |
| | 27 | Reserved[11] |
| | 26 | Reserved[10] |
| | 25 | Reserved[9] |
| | 24 | Reserved[8] |
| H2 | 23 | Reserved[7] |
| | 22 | Reserved[6] |
| | 21 | Reserved[5] |
| | 20 | Reserved[4] |
| | 19 | Reserved[3] |
| | 18 | Reserved[2] |
| | 17 | Reserved[1] |
| | 16 | Reserved[0] |

| Byte | Bit | Contents | |
|---|---|---|---|
| H1 | 15 | CRC[15] | X^15 |
| | 14 | CRC[14] | X^14 |
| | 13 | CRC[13] | X^13 |
| | 12 | CRC[12] | X^12 |
| | 11 | CRC[11] | X^11 |
| | 10 | CRC[10] | X^10 |
| | 9 | CRC[9] | X^9 |
| | 8 | CRC[8] | X^8 |
| H0 | 7 | CRC[7] | X^7 |
| | 6 | CRC[6] | X^6 |
| | 5 | CRC[5] | X^5 |
| | 4 | CRC[4] | X^4 |
| | 3 | CRC[3] | X^3 |
| | 2 | CRC[2] | X^2 |
| | 1 | CRC[1] | X^1 |
| | 0 | CRC[0] | X^0 |

FIG. 11

| Pixel | Bit | Compression Data | Bit | Byte | Bit | Compression Data | Bit | Decompression Pixel | Bit |
|---|---|---|---|---|---|---|---|---|---|
| Pixel 4*N | D_N[11] | Data 2*N | COMP_N[5] | Byte 3*N | COMP_N[5] | Data 2*N | COMP_N[5] | Pixel 4*N | D_N[11] |
| | D_N[10] | | COMP_N[4] | | COMP_N[4] | | COMP_N[4] | | D_N[10] |
| | D_N[9] | | COMP_N[3] | | COMP_N[3] | | COMP_N[3] | | D_N[9] |
| | D_N[8] | | COMP_N[2] | | COMP_N[2] | | COMP_N[2] | | D_N[8] |
| | D_N[7] | | COMP_N[1] | | COMP_N[1] | | COMP_N[1] | | D_N[7] |
| | D_N[6] | | COMP_N[0] | | COMP_N[0] | | COMP_N[0] | | D_N[6] |
| | D_N[5] | | COMP_N+1[5] | | COMP_N+1[5] | | COMP_N+1[5] | | D_N[5] |
| | D_N[4] | | COMP_N+1[4] | | COMP_N+1[4] | | COMP_N+1[4] | | D_N[4] |
| | D_N[3] | | COMP_N+1[3] | | COMP_N+2[5] | | COMP_N+1[3] | | D_N[3] |
| | D_N[2] | | COMP_N+1[2] | | COMP_N+2[4] | | COMP_N+1[2] | | D_N[2] |
| | D_N[1] | | COMP_N+1[1] | | COMP_N+2[3] | | COMP_N+1[1] | | D_N[1] |
| | D_N[0] | | COMP_N+1[0] | Byte 3*N+1 | COMP_N+2[2] | | COMP_N+1[0] | | D_N[0] |
| Pixel 4*N+1 | D_N+1[11] | Data 2*N+1 | COMP_N+2[5] | | COMP_N+2[1] | Data 2*N+1 | COMP_N+2[5] | Pixel 4*N+1 | D_N+1[11] |
| | D_N+1[10] | | COMP_N+2[4] | | COMP_N+2[0] | | COMP_N+2[4] | | D_N+1[10] |
| | D_N+1[9] | | COMP_N+2[3] | | COMP_N+3[5] | | COMP_N+2[3] | | D_N+1[9] |
| | D_N+1[8] | | COMP_N+2[2] | | COMP_N+3[4] | | COMP_N+2[2] | | D_N+1[8] |
| | D_N+1[7] | | COMP_N+2[1] | | COMP_N+1[3] | | COMP_N+2[1] | | D_N+1[7] |
| | D_N+1[6] | | COMP_N+2[0] | | COMP_N+1[2] | | COMP_N+2[0] | | D_N+1[6] |
| | D_N+1[5] | | COMP_N+3[5] | | COMP_N+1[1] | | COMP_N+3[5] | | D_N+1[5] |
| | D_N+1[4] | | COMP_N+3[4] | Byte 3*N+2 | COMP_N+1[0] | | COMP_N+3[4] | | D_N+1[4] |
| | D_N+1[3] | | COMP_N+3[3] | | COMP_N+3[3] | | COMP_N+3[3] | | D_N+1[3] |
| | D_N+1[2] | | COMP_N+3[2] | | COMP_N+3[2] | | COMP_N+3[2] | | D_N+1[2] |
| | D_N+1[1] | | COMP_N+3[1] | | COMP_N+3[1] | | COMP_N+3[1] | | D_N+1[1] |
| | D_N+1[0] | | COMP_N+3[0] | | COMP_N+3[0] | | COMP_N+3[0] | | D_N+1[0] |
| Pixel 4*N+2 | D_N+2[11] | | | | | | | Pixel 4*N+2 | D_N+2[11] |
| | D_N+2[10] | | | | | | | | D_N+2[10] |
| | D_N+2[9] | | | | | | | | D_N+2[9] |
| | D_N+2[8] | | | | | | | | D_N+2[8] |
| | D_N+2[7] | | | | | | | | D_N+2[7] |
| | D_N+2[6] | | | | | | | | D_N+2[6] |
| | D_N+2[5] | | | | | | | | D_N+2[5] |
| | D_N+2[4] | | | | | | | | D_N+2[4] |
| | D_N+2[3] | | | | | | | | D_N+2[3] |
| | D_N+2[2] | | | | | | | | D_N+2[2] |
| | D_N+2[1] | | | | | | | | D_N+2[1] |
| | D_N+2[0] | | | | | | | | D_N+2[0] |
| Pixel 4*N+3 | D_N+3[11] | | | | | | | Pixel 4*N+3 | D_N+3[11] |
| | D_N+3[10] | | | | | | | | D_N+3[10] |
| | D_N+3[9] | | | | | | | | D_N+3[9] |
| | D_N+3[8] | | | | | | | | D_N+3[8] |
| | D_N+3[7] | | | | | | | | D_N+3[7] |
| | D_N+3[6] | | | | | | | | D_N+3[6] |
| | D_N+3[5] | | | | | | | | D_N+3[5] |
| | D_N+3[4] | | | | | | | | D_N+3[4] |
| | D_N+3[3] | | | | | | | | D_N+3[3] |
| | D_N+3[2] | | | | | | | | D_N+3[2] |
| | D_N+3[1] | | | | | | | | D_N+3[1] |
| | D_N+3[0] | | | | | | | | D_N+3[0] |

FIG. 14

| Pixel | Bit |
|---|---|
| | D_N[11] |
| | D_N[10] |
| | D_N[9] |
| | D_N[8] |
| | D_N[7] |
| Pixel 2*N | D_N[6] |
| | D_N[5] |
| | D_N[4] |
| | D_N[3] |
| | D_N[2] |
| | D_N[1] |
| | D_N[0] |
| | D_N+1[11] |
| | D_N+1[10] |
| | D_N+1[9] |
| | D_N+1[8] |
| | D_N+1[7] |
| Pixel 2*N+1 | D_N+1[6] |
| | D_N+1[5] |
| | D_N+1[4] |
| | D_N+1[3] |
| | D_N+1[2] |
| | D_N+1[1] |
| | D_N+1[0] |

| Compression Data | Bit |
|---|---|
| | COMP_N[3] |
| | COMP_N[2] |
| | COMP_N[1] |
| Data N | COMP_N[0] |
| | COMP_N+1[3] |
| | COMP_N+1[2] |
| | COMP_N+1[1] |
| | COMP_N+1[0] |

| Byte | Bit |
|---|---|
| | COMP_N[3] |
| | COMP_N[2] |
| | COMP_N[1] |
| Byte N | COMP_N[0] |
| | COMP_N+1[3] |
| | COMP_N+1[2] |
| | COMP_N+1[1] |
| | COMP_N+1[0] |

| Compression Data | Bit |
|---|---|
| | COMP_N[3] |
| | COMP_N[2] |
| | COMP_N[1] |
| Data N | COMP_N[0] |
| | COMP_N+1[3] |
| | COMP_N+1[2] |
| | COMP_N+1[1] |
| | COMP_N+1[0] |

| Decompression Pixel | Bit |
|---|---|
| | D_N[11] |
| | D_N[10] |
| | D_N[9] |
| | D_N[8] |
| | D_N[7] |
| Pixel 2*N | D_N[6] |
| | D_N[5] |
| | D_N[4] |
| | D_N[3] |
| | D_N[2] |
| | D_N[1] |
| | D_N[0] |
| | D_N+1[11] |
| | D_N+1[10] |
| | D_N+1[9] |
| | D_N+1[8] |
| | D_N+1[7] |
| Pixel 2*N+1 | D_N+1[6] |
| | D_N+1[5] |
| | D_N+1[4] |
| | D_N+1[3] |
| | D_N+1[2] |
| | D_N+1[1] |
| | D_N+1[0] |

FIG. 15

| Pixel | Bit | Compression Data | Bit | Byte | Bit | Compression Data | Bit | Decompression Pixel | Bit |
|---|---|---|---|---|---|---|---|---|---|
| Pixel 6*N | D_N[11] | Data 2*N | COMP_N[3] | Byte 3*N | COMP_N[3] | Data 2*N | COMP_N[3] | Pixel 6*N | D_N[11] |
| | D_N[10] | | COMP_N[2] | | COMP_N[2] | | COMP_N[2] | | D_N[10] |
| | D_N[9] | | COMP_N[1] | | COMP_N[1] | | COMP_N[1] | | D_N[9] |
| | D_N[8] | | COMP_N[0] | | COMP_N[0] | | COMP_N[0] | | D_N[8] |
| | D_N[7] | | COMP_N+1[3] | | COMP_N+1[3] | | COMP_N+1[3] | | D_N[7] |
| | D_N[6] | | COMP_N+1[2] | | COMP_N+1[2] | | COMP_N+1[2] | | D_N[6] |
| | D_N[5] | | COMP_N+1[1] | | COMP_N+1[1] | | COMP_N+1[1] | | D_N[5] |
| | D_N[4] | | COMP_N+1[0] | | COMP_N+1[0] | | COMP_N+1[0] | | D_N[4] |
| | D_N[3] | | COMP_N+2[3] | | COMP_N+3[3] | | COMP_N+2[3] | | D_N[3] |
| | D_N[2] | | COMP_N+2[2] | | COMP_N+3[2] | | COMP_N+2[2] | | D_N[2] |
| | D_N[1] | | COMP_N+2[1] | | COMP_N+3[1] | | COMP_N+2[1] | | D_N[1] |
| | D_N[0] | | COMP_N+2[0] | Byte 3*N+1 | COMP_N+3[0] | | COMP_N+2[0] | | D_N[0] |
| Pixel 6*N+1 | D_N+1[11] | Data 2*N+1 | COMP_N+3[3] | | COMP_N+4[3] | Data 2*N+1 | COMP_N+3[3] | Pixel 6*N+1 | D_N+1[11] |
| | D_N+1[10] | | COMP_N+3[2] | | COMP_N+4[2] | | COMP_N+3[2] | | D_N+1[10] |
| | D_N+1[9] | | COMP_N+3[1] | | COMP_N+4[1] | | COMP_N+3[1] | | D_N+1[9] |
| | D_N+1[8] | | COMP_N+3[0] | | COMP_N+4[0] | | COMP_N+3[0] | | D_N+1[8] |
| | D_N+1[7] | | COMP_N+4[3] | | COMP_N+2[3] | | COMP_N+4[3] | | D_N+1[7] |
| | D_N+1[6] | | COMP_N+4[2] | | COMP_N+2[2] | | COMP_N+4[2] | | D_N+1[6] |
| | D_N+1[5] | | COMP_N+4[1] | | COMP_N+2[1] | | COMP_N+4[1] | | D_N+1[5] |
| | D_N+1[4] | | COMP_N+4[0] | Byte 3*N+2 | COMP_N+2[0] | | COMP_N+4[0] | | D_N+1[4] |
| | D_N+1[3] | | COMP_N+5[3] | | COMP_N+5[3] | | COMP_N+5[3] | | D_N+1[3] |
| | D_N+1[2] | | COMP_N+5[2] | | COMP_N+5[2] | | COMP_N+5[2] | | D_N+1[2] |
| | D_N+1[1] | | COMP_N+5[1] | | COMP_N+5[1] | | COMP_N+5[1] | | D_N+1[1] |
| | D_N+1[0] | | COMP_N+5[0] | | COMP_N+5[0] | | COMP_N+5[0] | | D_N+1[0] |
| Pixel 6*N+2 | D_N+2[11] | | | | | | | Pixel 6*N+2 | D_N+2[11] |
| | D_N+2[10] | | | | | | | | D_N+2[10] |
| | D_N+2[9] | | | | | | | | D_N+2[9] |
| | D_N+2[8] | | | | | | | | D_N+2[8] |
| | D_N+2[7] | | | | | | | | D_N+2[7] |
| | D_N+2[6] | | | | | | | | D_N+2[6] |
| | D_N+2[5] | | | | | | | | D_N+2[5] |
| | D_N+2[4] | | | | | | | | D_N+2[4] |
| | D_N+2[3] | | | | | | | | D_N+2[3] |
| | D_N+2[2] | | | | | | | | D_N+2[2] |
| | D_N+2[1] | | | | | | | | D_N+2[1] |
| | D_N+2[0] | | | | | | | | D_N+2[0] |
| Pixel 6*N+3 | D_N+3[11] | | | | | | | Pixel 6*N+3 | D_N+3[11] |
| | D_N+3[10] | | | | | | | | D_N+3[10] |
| | D_N+3[9] | | | | | | | | D_N+3[9] |
| | D_N+3[8] | | | | | | | | D_N+3[8] |
| | D_N+3[7] | | | | | | | | D_N+3[7] |
| | D_N+3[6] | | | | | | | | D_N+3[6] |
| | D_N+3[5] | | | | | | | | D_N+3[5] |
| | D_N+3[4] | | | | | | | | D_N+3[4] |
| | D_N+3[3] | | | | | | | | D_N+3[3] |
| | D_N+3[2] | | | | | | | | D_N+3[2] |
| | D_N+3[1] | | | | | | | | D_N+3[1] |
| | D_N+3[0] | | | | | | | | D_N+3[0] |
| Pixel 6*N+4 | D_N+4[11] | | | | | | | Pixel 6*N+4 | D_N+4[11] |
| | D_N+4[10] | | | | | | | | D_N+4[10] |
| | D_N+4[9] | | | | | | | | D_N+4[9] |
| | D_N+4[8] | | | | | | | | D_N+4[8] |
| | D_N+4[7] | | | | | | | | D_N+4[7] |
| | D_N+4[6] | | | | | | | | D_N+4[6] |
| | D_N+4[5] | | | | | | | | D_N+4[5] |
| | D_N+4[4] | | | | | | | | D_N+4[4] |
| | D_N+4[3] | | | | | | | | D_N+4[3] |
| | D_N+4[2] | | | | | | | | D_N+4[2] |
| | D_N+4[1] | | | | | | | | D_N+4[1] |
| | D_N+4[0] | | | | | | | | D_N+4[0] |
| Pixel 6*N+5 | D_N+5[11] | | | | | | | Pixel 6*N+5 | D_N+5[11] |
| | D_N+5[10] | | | | | | | | D_N+5[10] |
| | D_N+5[9] | | | | | | | | D_N+5[9] |
| | D_N+5[8] | | | | | | | | D_N+5[8] |
| | D_N+5[7] | | | | | | | | D_N+5[7] |
| | D_N+5[6] | | | | | | | | D_N+5[6] |
| | D_N+5[5] | | | | | | | | D_N+5[5] |
| | D_N+5[4] | | | | | | | | D_N+5[4] |
| | D_N+5[3] | | | | | | | | D_N+5[3] |
| | D_N+5[2] | | | | | | | | D_N+5[2] |
| | D_N+5[1] | | | | | | | | D_N+5[1] |
| | D_N+5[0] | | | | | | | | D_N+5[0] |

| Pixel | Bit | Compression Data | Bit | Byte | Bit | Compression Data | Bit | Decompression Pixel | Bit |
|---|---|---|---|---|---|---|---|---|---|
| Pixel 8*N | D_N[9] | Data 4*N | COMP_N[4] | Byte 5*N | COMP_N[4] | Data 4*N | COMP_N[4] | Pixel 8*N | D_N[9] |
| | D_N[8] | | COMP_N[3] | | COMP_N[3] | | COMP_N[3] | | D_N[8] |
| | D_N[7] | | COMP_N[2] | | COMP_N[2] | | COMP_N[2] | | D_N[7] |
| | D_N[6] | | COMP_N[1] | | COMP_N[1] | | COMP_N[1] | | D_N[6] |
| | D_N[5] | | COMP_N[0] | | COMP_N[0] | | COMP_N[0] | | D_N[5] |
| | D_N[4] | | COMP_N+1[4] | | COMP_N+1[4] | | COMP_N+1[4] | | D_N[4] |
| | D_N[3] | | COMP_N+1[3] | | COMP_N+1[3] | | COMP_N+1[3] | | D_N[3] |
| | D_N[2] | | COMP_N+1[2] | | COMP_N+1[2] | | COMP_N+1[2] | | D_N[2] |
| | D_N[1] | | COMP_N+1[1] | Byte 5*N+1 | COMP_N+2[4] | | COMP_N+1[1] | | D_N[1] |
| | D_N[0] | | COMP_N+1[0] | | COMP_N+2[3] | | COMP_N+1[0] | | D_N[0] |
| Pixel 8*N+1 | D_N+1[9] | Data 4*N+1 | COMP_N+2[4] | | COMP_N+2[2] | Data 4*N+1 | COMP_N+2[4] | Pixel 8*N+1 | D_N+1[9] |
| | D_N+1[8] | | COMP_N+2[3] | | COMP_N+2[1] | | COMP_N+2[3] | | D_N+1[8] |
| | D_N+1[7] | | COMP_N+2[2] | | COMP_N+2[0] | | COMP_N+2[2] | | D_N+1[7] |
| | D_N+1[6] | | COMP_N+2[1] | | COMP_N+3[4] | | COMP_N+2[1] | | D_N+1[6] |
| | D_N+1[5] | | COMP_N+2[0] | | COMP_N+3[3] | | COMP_N+2[0] | | D_N+1[5] |
| | D_N+1[4] | | COMP_N+3[4] | | COMP_N+3[2] | | COMP_N+3[4] | | D_N+1[4] |
| | D_N+1[3] | | COMP_N+3[3] | | COMP_N+4[4] | | COMP_N+3[3] | | D_N+1[3] |
| | D_N+1[2] | | COMP_N+3[2] | | COMP_N+4[3] | | COMP_N+3[2] | | D_N+1[2] |
| | D_N+1[1] | | COMP_N+3[1] | | COMP_N+4[2] | | COMP_N+3[1] | | D_N+1[1] |
| | D_N+1[0] | | COMP_N+3[0] | Byte 5*N+2 | COMP_N+4[1] | | COMP_N+3[0] | | D_N+1[0] |
| Pixel 8*N+2 | D_N+2[9] | Data 4*N+2 | COMP_N+4[4] | | COMP_N+4[0] | Data 4*N+2 | COMP_N+4[4] | Pixel 8*N+2 | D_N+2[9] |
| | D_N+2[8] | | COMP_N+4[3] | | COMP_N+5[4] | | COMP_N+4[3] | | D_N+2[8] |
| | D_N+2[7] | | COMP_N+4[2] | | COMP_N+5[3] | | COMP_N+4[2] | | D_N+2[7] |
| | D_N+2[6] | | COMP_N+4[1] | | COMP_N+5[2] | | COMP_N+4[1] | | D_N+2[6] |
| | D_N+2[5] | | COMP_N+4[0] | | COMP_N+6[4] | | COMP_N+4[0] | | D_N+2[5] |
| | D_N+2[4] | | COMP_N+5[4] | | COMP_N+6[3] | | COMP_N+5[4] | | D_N+2[4] |
| | D_N+2[3] | | COMP_N+5[3] | | COMP_N+6[2] | | COMP_N+5[3] | | D_N+2[3] |
| | D_N+2[2] | | COMP_N+5[2] | Byte 5*N+3 | COMP_N+6[1] | | COMP_N+5[2] | | D_N+2[2] |
| | D_N+2[1] | | COMP_N+5[1] | | COMP_N+6[0] | | COMP_N+5[1] | | D_N+2[1] |
| | D_N+2[0] | | COMP_N+5[0] | | COMP_N+7[4] | | COMP_N+5[0] | | D_N+2[0] |
| Pixel 8*N+3 | D_N+3[9] | Data 4*N+3 | COMP_N+6[4] | | COMP_N+7[3] | Data 4*N+3 | COMP_N+6[4] | Pixel 8*N+3 | D_N+3[9] |
| | D_N+3[8] | | COMP_N+6[3] | | COMP_N+7[2] | | COMP_N+6[3] | | D_N+3[8] |
| | D_N+3[7] | | COMP_N+6[2] | | COMP_N+1[1] | | COMP_N+6[2] | | D_N+3[7] |
| | D_N+3[6] | | COMP_N+6[1] | | COMP_N+1[0] | | COMP_N+6[1] | | D_N+3[6] |
| | D_N+3[5] | | COMP_N+6[0] | | COMP_N+3[1] | | COMP_N+6[0] | | D_N+3[5] |
| | D_N+3[4] | | COMP_N+7[4] | Byte 5*N+4 | COMP_N+3[0] | | COMP_N+7[4] | | D_N+3[4] |
| | D_N+3[3] | | COMP_N+7[3] | | COMP_N+5[1] | | COMP_N+7[3] | | D_N+3[3] |
| | D_N+3[2] | | COMP_N+7[2] | | COMP_N+5[0] | | COMP_N+7[2] | | D_N+3[2] |
| | D_N+3[1] | | COMP_N+7[1] | | COMP_N+7[1] | | COMP_N+7[1] | | D_N+3[1] |
| | D_N+3[0] | | COMP_N+7[0] | | COMP_N+7[0] | | COMP_N+7[0] | | D_N+3[0] |
| Pixel 8*N+4 | D_N+4[9] | | | | | | | Pixel 8*N+4 | D_N+4[9] |
| | D_N+4[8] | | | | | | | | D_N+4[8] |
| | D_N+4[7] | | | | | | | | D_N+4[7] |
| | D_N+4[6] | | | | | | | | D_N+4[6] |
| | D_N+4[5] | | | | | | | | D_N+4[5] |
| | D_N+4[4] | | | | | | | | D_N+4[4] |
| | D_N+4[3] | | | | | | | | D_N+4[3] |
| | D_N+4[2] | | | | | | | | D_N+4[2] |
| | D_N+4[1] | | | | | | | | D_N+4[1] |
| | D_N+4[0] | | | | | | | | D_N+4[0] |
| Pixel 8*N+5 | D_N+5[9] | | | | | | | Pixel 8*N+5 | D_N+5[9] |
| | D_N+5[8] | | | | | | | | D_N+5[8] |
| | D_N+5[7] | | | | | | | | D_N+5[7] |
| | D_N+5[6] | | | | | | | | D_N+5[6] |
| | D_N+5[5] | | | | | | | | D_N+5[5] |
| | D_N+5[4] | | | | | | | | D_N+5[4] |
| | D_N+5[3] | | | | | | | | D_N+5[3] |
| | D_N+5[2] | | | | | | | | D_N+5[2] |
| | D_N+5[1] | | | | | | | | D_N+5[1] |
| | D_N+5[0] | | | | | | | | D_N+5[0] |
| Pixel 8*N+6 | D_N+6[9] | | | | | | | Pixel 8*N+6 | D_N+6[9] |
| | D_N+6[8] | | | | | | | | D_N+6[8] |
| | D_N+6[7] | | | | | | | | D_N+6[7] |
| | D_N+6[6] | | | | | | | | D_N+6[6] |
| | D_N+6[5] | | | | | | | | D_N+6[5] |
| | D_N+6[4] | | | | | | | | D_N+6[4] |
| | D_N+6[3] | | | | | | | | D_N+6[3] |
| | D_N+6[2] | | | | | | | | D_N+6[2] |
| | D_N+6[1] | | | | | | | | D_N+6[1] |
| | D_N+6[0] | | | | | | | | D_N+6[0] |
| Pixel 8*N+7 | D_N+7[9] | | | | | | | Pixel 8*N+7 | D_N+7[9] |
| | D_N+7[8] | | | | | | | | D_N+7[8] |
| | D_N+7[7] | | | | | | | | D_N+7[7] |
| | D_N+7[6] | | | | | | | | D_N+7[6] |
| | D_N+7[5] | | | | | | | | D_N+7[5] |
| | D_N+7[4] | | | | | | | | D_N+7[4] |
| | D_N+7[3] | | | | | | | | D_N+7[3] |
| | D_N+7[2] | | | | | | | | D_N+7[2] |
| | D_N+7[1] | | | | | | | | D_N+7[1] |
| | D_N+7[0] | | | | | | | | D_N+7[0] |

CONVERSATION OF PIXEL DATA INTO COMPRESSION FORMAT OF PIXELS

TECHNICAL FIELD

The present technique relates to an image sensor, a data transmission method thereof, an information processing apparatus, an information processing method, an electronic device, and a program. Specifically, the present invention relates to an image sensor, a data transmission method thereof, an information processing apparatus, an information processing method, an electronic device, and a program with which it becomes possible to transmit image data in a prescribed format without changing an existence interface for data transmission and to improve flexibility with respect to a compression method or connection with image processing large scale integration (LSI).

BACKGROUND ART

In a device such as a digital camera, an image imaged by an image sensor is converted into compression data and is supplied through an interface to image processing LSI included in a digital signal processor (DSP) or the like.

Incidentally, as a compression data method in which transmission is performed between an interface of the image sensor and that of the image processing LSI, for example, a method which is a combination of a differential pulse code modulation (DPCM) and a pulse code modulation (PCM) is employed. For example, with respect to an interface between chips for a mobile phone, a standard mobile imaging architecture (SMIA) standard is provided as a standard for compression data (see Non-Patent Document 1).

Also, a method to compress an N bit signal into an n bit signal, to perform decomposition and connection thereof, and to perform an output as N bits is proposed (see Patent Document 1). A purpose is to shorten a pixel data output period by adjusting a data rate, which is reduced into n bits, to a data rate of N bits. That is, for example, 12-bit pixel data is compressed into eight bits and a next pixel is decomposed into four bits. Then, transmission as 12-bit data is performed.

CITATION LIST

Non-Patent Document

Non-Patent Document 1: SMIA 1.0 Part 1: Functional specification

Patent Document

Patent Document 1: Japanese Patent Application Laid-Open No. 2011-049901

SUMMARY OF THE INVENTION

Problems to be Solved by the Invention

However, in the SMIA standard, it is necessary to treat compressed data as RAW data of one pixel. Thus, in order to deal with various kinds of compression data, it is necessary to newly develop an RAW standard.

Thus, in order to change a compression rate, it becomes necessary to change a format converter circuit in a LINK layer and to correct a packing circuit.

Also, in a technique in Patent Document 1, it is assumed that the number of bits of pixel data before compression and that during data transmission is identical. Thus, for example, it is difficult to set a compression rate in such a manner that 12-bit pixel data is converted into five bits and it is not possible to set a compression rate freely. In addition, a method for application to 8B10B transmission which corresponds to a clock data recovery method corresponding to high-speed transmission is not described.

The present technique has been provided in view of the forgoing. Specifically, the present technique makes it possible to set various compression rates while using an existing interface by converting a plurality of pieces of pixel data into a compression format of various numbers of pixels, performing conversion into a prescribed transmission format, and performing transmission.

Solutions to Problems

An image sensor of a first aspect of the present technique includes: an imaging unit configured to image an original image; a compression unit configured to compress a plurality of pieces of pixel data of the original image into a compression format; and a conversion unit configured to convert the compression format of the plurality of pieces of pixel data of the original image into a transmission format of the plurality of pieces of pixel data.

A bit length of the transmission format may be different from a bit length of the compression format.

The bit length of the transmission format may be identical to the bit length of the compression format.

The compression unit may perform compression into the compression format in a unit of the plurality pieces of pixel data of the original image, and the conversion unit may convert the compression format which is compressed in the unit of the plurality of pieces of pixel data of the original image into the plurality of transmission formats.

The conversion unit may arrange virtual data into pixel data processed in the unit of the plurality of pieces of pixel data for matching with a block size when converting the compression format which is compressed in the unit of the plurality of pieces of pixel data of the original image into the plurality of transmission formats.

A setting unit configured to set the a compression rate according to image quality of the original image may be further included, wherein the compression unit may compress the plurality of pieces of pixel data of the original image into a compression format at the compression rate set by the setting unit.

A data transmission method of the image sensor of the first aspect of the present technique includes the steps of: imaging an original image; compressing a plurality of pieces of pixel data of the original image into a compression format; and converting the compression format of the plurality of pieces of pixel data of the original image into a transmission format of the plurality of pieces of pixel data.

A program of the first aspect of the present technique causes a computer to execute processing including an imaging step to image an original image, a compression step to compress a plurality of pieces of pixel data of the original image into a compression format, and a conversion step to convert the compression format of the plurality of pieces of pixel data of the original image into a transmission format of the plurality of pieces of pixel data.

An information processing apparatus of a second aspect of the present technique includes: a decompression unit configured to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data; and an expansion unit configured to expand the compression format decompressed by the decompression unit into the plurality of pieces of pixel data of the original image.

A bit length of the transmission format may be different from a bit length of the compression format.

The bit length of the transmission format may be identical to the bit length of the compression format.

The decompression unit may decompress the plurality of transmission formats into the compression format in a unit of the plurality of pieces of pixel data of the original image, and the expansion unit may expand the compression format compressed in the unit of the plurality of pieces of pixel data of the original image into the plurality of pieces of pixel data.

A setting unit configured to set a compression rate according to image quality of the original image may be further included, wherein the expansion unit may expand the compression format into the plurality of pieces of pixel data of the original image based on the compression rate set by the setting unit.

An information processing method of the second aspect of the present technique includes the steps of: decompressing a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data; and expanding the decompressed compression format into the plurality of pieces of pixel data of the original image.

A program of the second aspect of the present technique causes a computer to execute processing including a decompression step to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data, and an expansion step to expand the compression format, which is decompressed by the processing in the decompression step, into the plurality of pieces of pixel data of the original image.

An electronic device of the third aspect of the present technique includes: an imaging unit configured to image an original image; a compression unit configured to compress a plurality of pieces of pixel data of the original image into a compression format; and a conversion unit configured to convert the compression format of the plurality of pieces of pixel data of the original image into a transmission format of the plurality of pieces of pixel data.

An electronic device of the fourth aspect of the present technique includes: a decompression unit configured to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data, and an expansion unit configured to expand the compression format decompressed by the decompression unit into the plurality of pieces of pixel data of the original image.

In the first and third aspects of the present technique, an original image is imaged, a plurality of pieces of pixel data of the original image is compressed into a compression format, and the compression format of the plurality of pieces of pixel data of the original image is converted into a transmission format of the plurality of pieces of pixel data.

In the second and fourth aspects of the present technique, the transmission format of the plurality of pieces of pixel data, which format is converted from the compression format of the plurality of pieces of pixel data of the original image into which compression format the plurality of pieces of pixel data of the original image is compressed, is decompressed into the compression format of the plurality of pieces of pixel data, and the decompressed compression format is expanded into the plurality of pieces of pixel data of the original image.

Each of the image sensor and the electronic device of the first to fourth aspects of the present technique may be an independent apparatus or electronic device or may be a block to perform each processing.

Effects of the Invention

According to the first to fourth aspects of the present technique, it becomes possible to transmit image data in a prescribed format without making a change in an existence interface of data transmission and to increase flexibility with respect to a compression rate or connection with various types of image processing LSI.

BRIEF DESCRIPTION OF DRAWINGS

FIG. 7 is a view illustrating contents and an information amount of header information.

FIG. 8 is a view illustrating an example of a bit array.

FIG. 11 is a view for describing an example of performing data transmission processing and data reception processing by converting a 12-bit original image data format into a six-bit compression data format.

FIG. 14 is a view for describing a first example of performing data transmission processing and data reception processing by converting a 12-bit original image data format into a four-bit compression data format.

FIG. 15 is a view for describing a second example of performing data transmission processing and data reception processing by converting a 12-bit original image data format into a four-bit compression data format.

FIG. 16 is a view for describing an example of performing data transmission processing and data reception processing by converting a 10-bit original image data format into a six-bit compression data format.

FIG. 17 is a view for describing an example of performing data transmission processing and data reception processing by converting a 10-bit original image data format into a five-bit compression data format.

FIG. 18 is a view for describing an example of performing data transmission processing and data reception processing by converting a 12-bit original image data format of 32 pixels into a compression data format of 16 pixels which format includes a configuration identical to that of the 12-bit original image data format.

FIG. 19 is a view for describing an example of performing data transmission processing and data reception processing by converting a 12-bit original image data format of 32 pixels into a compression data format of 16 pixels which format includes a configuration identical to that of the 12-bit original image data format.

FIG. 20 is a view for describing an example of performing data transmission processing and data reception processing by converting a 12-bit original image data format of 32 pixels into a compression data format of 16 pixels which format includes a configuration identical to that of the 12-bit original image data format.

MODE FOR CARRYING OUT THE INVENTION

<First Configuration Example of Transmission system>

First, with reference to FIG. 1, a first configuration example of a transmission system according to an embodiment of the present invention will be described.

Figure 1:
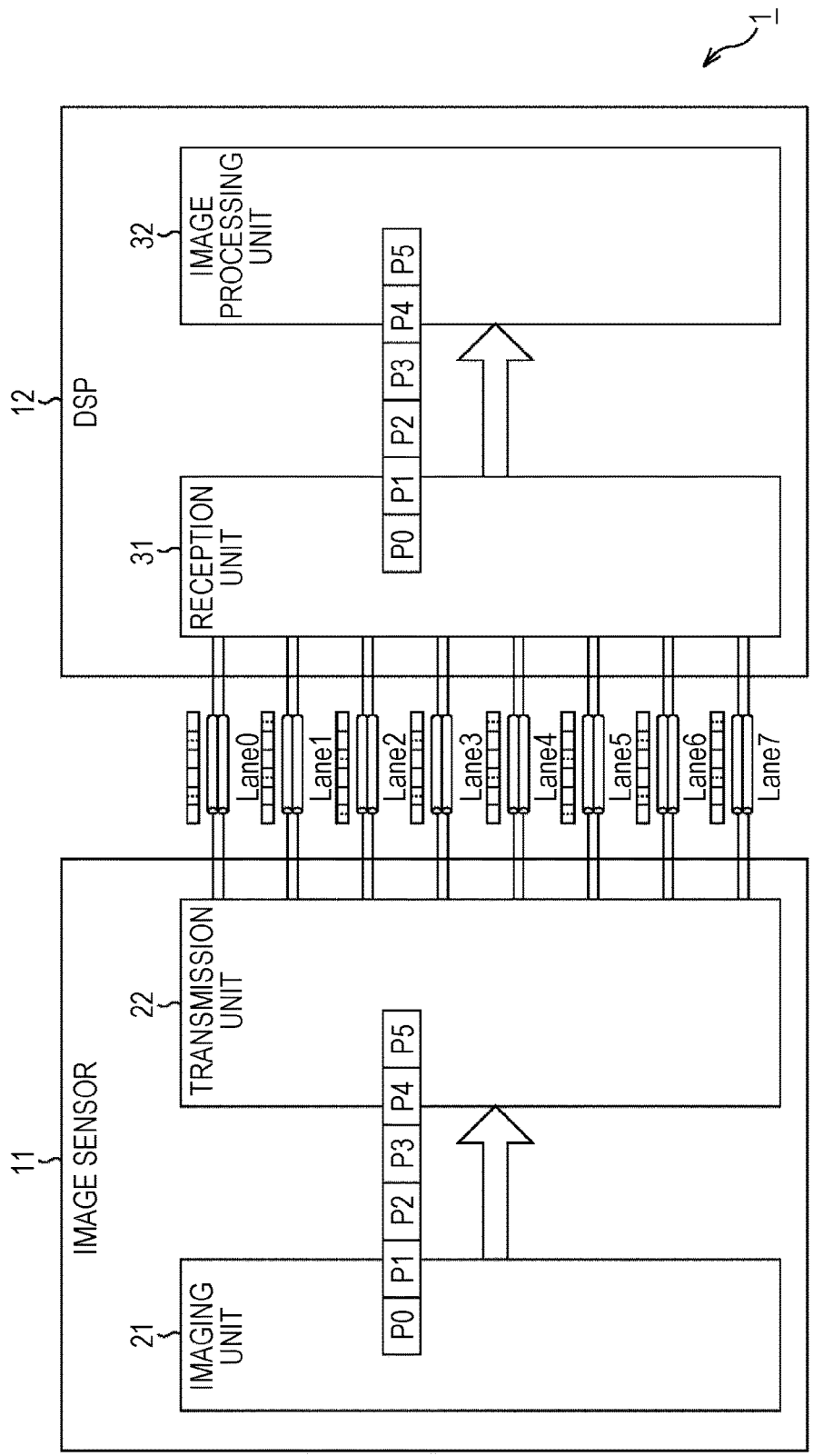
FIG. 1 is a view illustrating a first configuration example of a transmission system.

A transmission system 1 in FIG. 1 includes an image sensor 11 and a DSP 12. The image sensor 11 and the DSP 12 respectively include large scale integrated circuits (LSI) which are different from each other. The image sensor 11 and the DSP 12 are provided in an imaging apparatus, which includes an imaging function, such as a digital camera or a mobile function. To the image sensor 11, an imaging unit 21 and a transmission unit 22 are provided. To the DSP 12, a reception unit 31 and an image processing unit 32 are provided.

The imaging unit 21 of the image sensor 11 includes an imaging element such as a complementary metal oxide semiconductor (CMOS) and performs photoelectric conversion of light received through a lens. Also, the imaging unit 21 performs A/D conversion or the like of a signal acquired by the photoelectric conversion and serially outputs pixel data included in an image in one frame to the transmission unit 22 by data in one pixel.

The transmission unit 22 assigns, to a plurality of transmission paths, the data of each pixel which data is supplied by the imaging unit 21, for example, in an order supplied by the imaging unit 21 and transmits the data to the DSP 12 in parallel through the plurality of transmission paths. In an example in FIG. 1, transmission of the pixel data is performed by using eight transmission paths. A transmission path between the image sensor 11 and the DSP 12 may be a wired transmission path or a wireless transmission path. In the following, the transmission path between the image sensor 11 and the DSP 12 is arbitrarily referred to as a Lane.

The reception unit 31 of the DSP 12 receives pixel data transmitted from the transmission unit 22 through the eight Lanes and serially outputs the data of each pixel to the image processing unit 32.

Based on the pixel data supplied by the reception unit 31, the image processing unit 32 generates an image in one frame and performs various kinds of image processing by using the generated image. The image data transmitted from the image sensor 11 to the DSP 12 is RAW data. In the image processing unit 32, various kinds of processing such as compression of image data, display of an image, or recording of image data into a recording medium is performed.

<Second Configuration Example of Transmission System>

Figure 2:
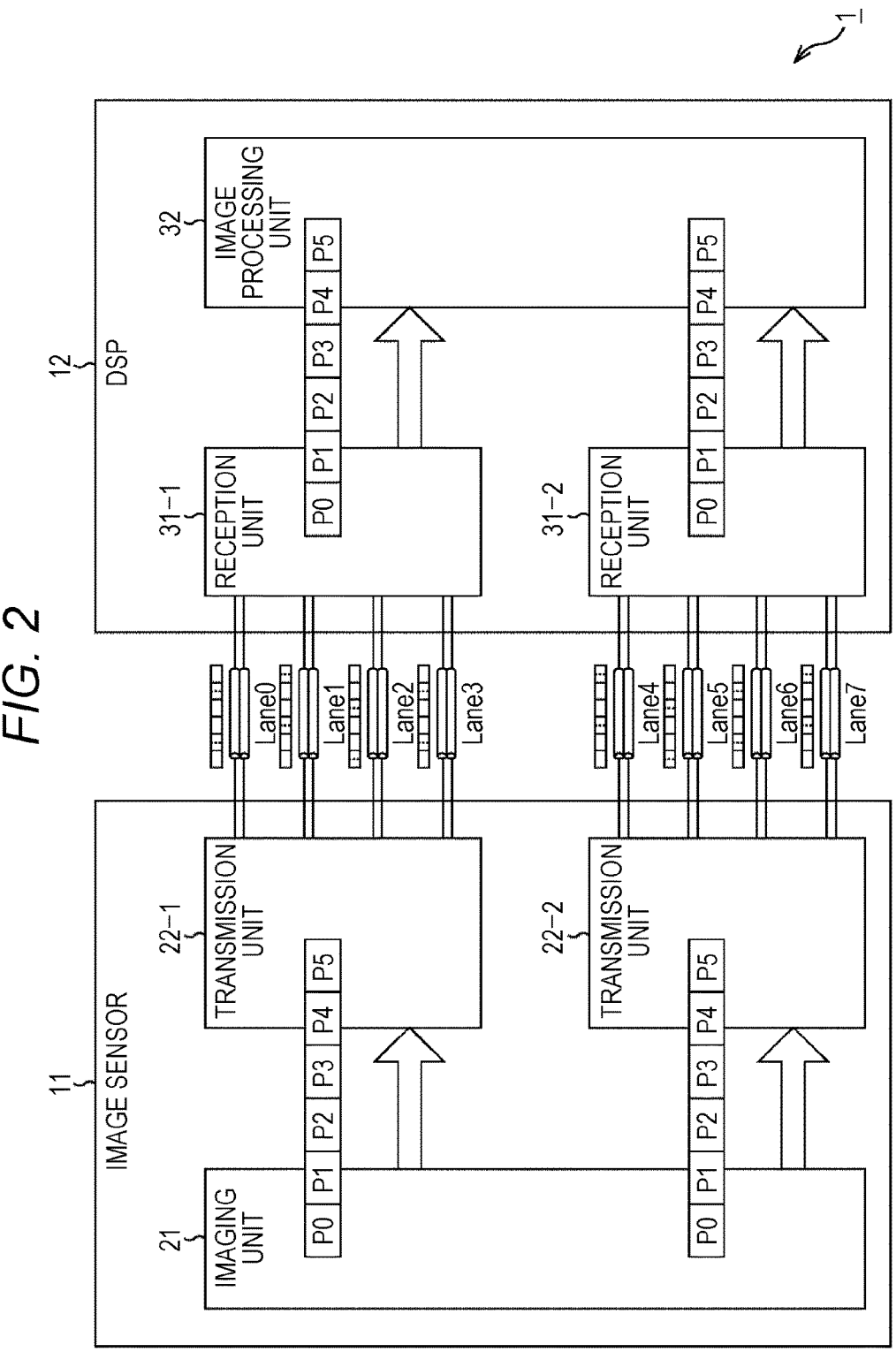
FIG. 2 is a second configuration example of the transmission system.

Next, with reference to FIG. 2, a second configuration example of the transmission system 1 will be described. To a configuration which is illustrated in FIG. 2 and which is identical to the configuration illustrated in FIG. 1, the same reference sign is assigned. An Overlap description is arbitrarily omitted.

To an image sensor 11 of the transmission system 1 in FIG. 2, an imaging unit 21 and two transmission units 22-1 and 22-2 are provided. To a DSP 12, two reception units 31-1 and 31-2 and an image processing unit 32 are provided.

The imaging unit 21 outputs pixel data, which is included in an image in one frame acquired by imaging, in parallel to the transmission unit 22-1 and the transmission unit 22-2 by data of one pixel. For example, the imaging unit 21 outputs data of a pixel in an odd line to the transmission unit 22-1 and outputs data of a pixel in an even line to the transmission unit 22-2.

The transmission unit 22-1 assigns, to a plurality of Lanes, the data of each pixel which data is supplied by the imaging unit 21, for example, in an order supplied by the imaging unit 21 and transmits the data to the DSP 12 in parallel through the plurality of Lanes. Similarly, the transmission unit 22-2 assigns, to a plurality of Lanes, the data of each pixel which data is supplied by the imaging unit 21, for example, in an order supplied by the imaging unit 21 and transmits the data to the DSP 12 in parallel through the plurality of Lanes.

In the example in FIG. 2, the image sensor 11 and the DSP 12 are also connected to each other through eight Lanes. Each of the transmission unit 22-1 and the transmission unit 22-2 transmits pixel data by using four Lanes.

The reception unit 31-1 of the DSP 12 receives pixel data transmitted from the transmission unit 22-1 through the four Lanes and serially outputs data of each pixel to the image processing unit 32. Similarly, the reception unit 31-2 receives pixel data transmitted from the transmission unit 22-2 through the four Lanes and serially outputs data of each pixel to the image processing unit 32.

Based on the pixel data supplied by the reception unit 31-1 and the pixel data supplied by the reception unit 31-2, the image processing unit 32 generates an image in one frame and performs various kinds of image processing by using the generated image.

As illustrated in FIG. 2, two transmission units are provided in the image sensor 11 and two reception units are provided in the DSP 12 correspondingly. Thus, even when a transmission rate of the pixel data output from the imaging unit 21 is high, it becomes possible to transmit the pixel data to the DSP 12.

<Third Configuration Example of Transmission System>

Figure 3:
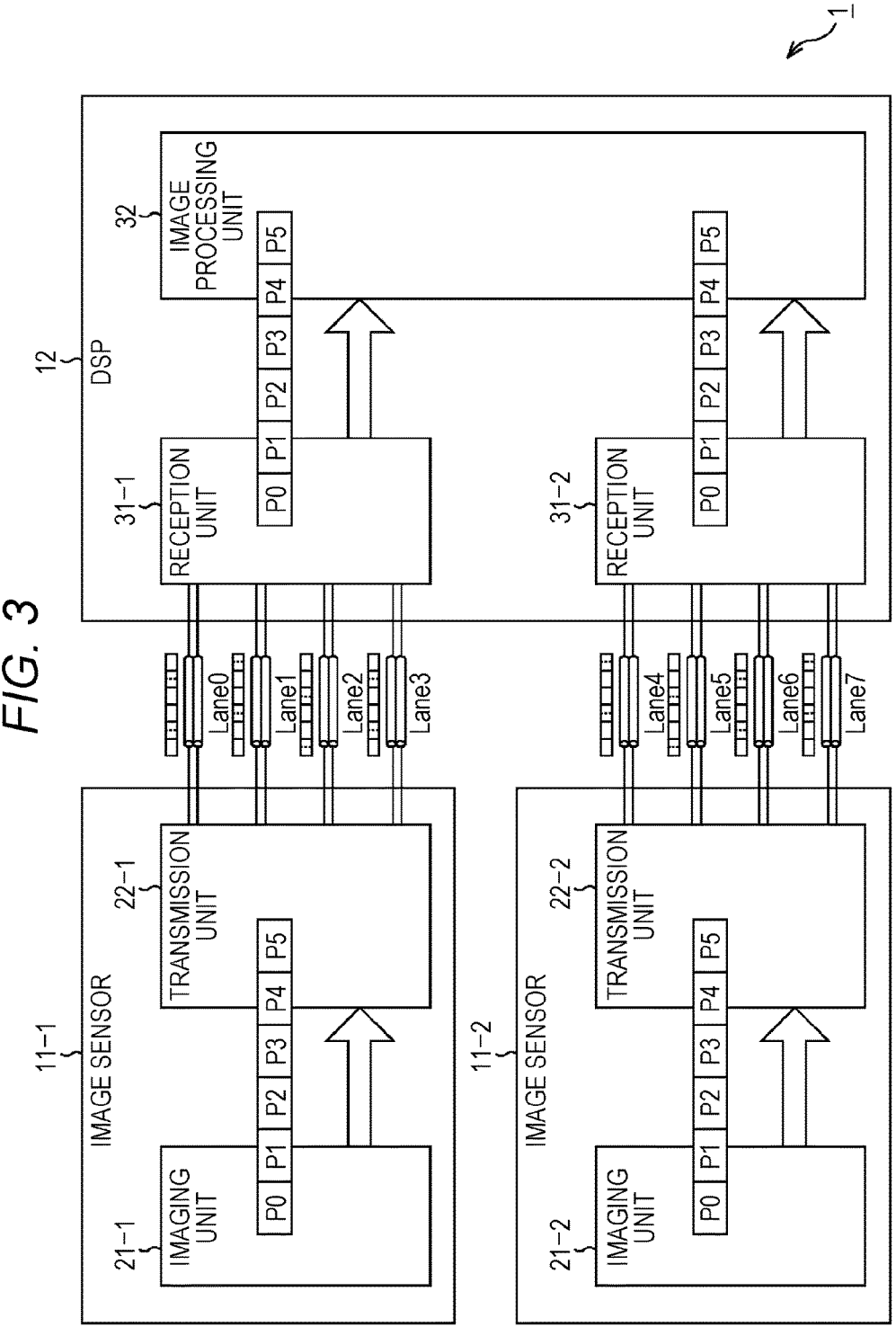
FIG. 3 is a view illustrating a third configuration example of the transmission system.

Next, with reference to FIG. 3, a third configuration example of the transmission system 1 will be described. To a configuration which is illustrated in FIG. 3 and which is identical to the configuration illustrated in FIG. 1, the same reference sign is assigned. An Overlap description is arbitrarily omitted.

To the transmission system 1 in FIG. 3, two image sensors which are an image sensor 11-1 and an image sensor 11-2 are provided. To the image sensor 11-1, an imaging unit 21-1 and a transmission unit 22-1 is provided. To the image sensor 11-2, an imaging unit 21-2 and a transmission unit 22-2 are provided. Similarly to the case in FIG. 2, to the DSP 12, two reception units 31-1 and 31-2 and an image processing unit 32 are provided.

The imaging unit 21-1 of the image sensor 11-1 serially outputs pixel data, which is included in an image in one frame which image is acquired by imaging, by data of one pixel to the transmission unit 22-1.

The transmission unit 22-1 assigns, to a plurality of Lanes, the data of each pixel which data is supplied by the imaging unit 21-1, for example, in an order supplied by the imaging unit 21-1 and transmits the data to the DSP 12 in parallel through the plurality of Lanes.

The imaging unit 21-2 of the image sensor 11-2 serially outputs pixel data, which is included in an image in one frame which image is acquired by imaging, by data of one pixel to the transmission unit 22-2.

The transmission unit 22-2 assigns, to a plurality of Lanes, the data of each pixel which data is supplied by the imaging unit 21-2, for example, in an order supplied by the imaging unit 21-2 and transmits the data to the DSP 12 in parallel through the plurality of Lanes.

In the example in FIG. 3, a side of the image sensor and the DSP 12 are also connected to each other through eight Lanes. Four Lanes are assigned to each of the image sensor 11-1 and the image sensor 11-2. Each of the transmission unit 22-1 and the transmission unit 22-2 transmits pixel data by using four Lanes.

The reception unit 31-1 of the DSP 12 receives the pixel data transmitted from the transmission unit 22-1 of the image sensor 11-1 through the four Lanes and serially outputs data of each pixel to the image processing unit 32. Similarly, the reception unit 31-2 receives the pixel data transmitted from the transmission unit 22-2 of the image sensor 11-2 through the four Lanes and serially outputs data of each pixel to the image processing unit 32.

The image processing unit 32 generates an image in one frame based on the pixel data supplied by the reception unit 31-1 and generates an image in one frame based on the pixel data supplied by the reception unit 31-2. The image processing unit 32 performs various kinds of image processing by using the generated image.

As illustrated in FIG. 3, by providing two image sensors, for example, it becomes possible to process, with one DSP 12, a 3D image including a left-eye image imaged by the image sensor 11-1 and a right-eye image imaged by the image sensor 11-2. There is a parallax between the left-eye image and the right-eye image.

As described above, to the image sensor in the transmission system 1, one or more transmission units to transmit imaged image data in one frame are provided. On the other hand, to the DSP, one or more reception units to receive data transmitted from the image sensor are provided corresponding to the transmission units of the image sensor.

In the following, data transmission in the transmission system 1 in FIG. 1 in which system one transmission unit is provided in the image sensor 11 and one reception unit is provided in the DSP 12 will be described. Data transmission is performed similarly between the transmission unit 22-1 and the reception unit 31-1 and between the transmission unit 22-2 and the reception unit 31-2 which are in FIG. 2 and FIG. 3.

<Frame Format>

Next, with reference to FIG. 4, an example of a format used to transmit image data in one frame between the image sensor 11 and the DSP 12 will be described.

An effective pixel region A1 is a region of an effective pixel of the image in one frame which image is imaged by the imaging unit 21. On a left side of the effective pixel region A1, a margin region A2 is set, the number of pixels in a vertical direction thereof being identical to the number of pixels in a vertical direction of the effective pixel region A1.

On an upper side of the effective pixel region A1, a front dummy region A3 is set, the number of pixels in a horizontal direction thereof being identical to the total number of pixels in a horizontal direction of the effective pixel region A1 and the margin region A2. In the example in FIG. 4, Embedded Data is inserted into the front dummy region A3. The Embedded Data includes information of a set value, which is related to imaging by the imaging unit 21, such as a shutter speed, an aperture value, or gain. There is a case where the Embedded Data is inserted into a rear dummy region A4.

On a lower side of the effective pixel region A1, the rear dummy region A4 is set, the number of pixels in a horizontal direction thereof being identical to the total number of pixels in the horizontal direction of the effective pixel region A1 and the margin region A2.

An image data region A11 includes the effective pixel region A1, the margin region A2, the front dummy region A3, and the rear dummy region A4.

A header is added in front of each line included in the image data region A11 and a Start Code is added in front of the header. Also, a footer is optionally added behind each line included in the image data region A11 and a control code, which will be described later, such as an End Code is added behind the footer. When the footer is not added, the control code such as the End Code is added behind each line included in the image data region A11.

Figure 4:
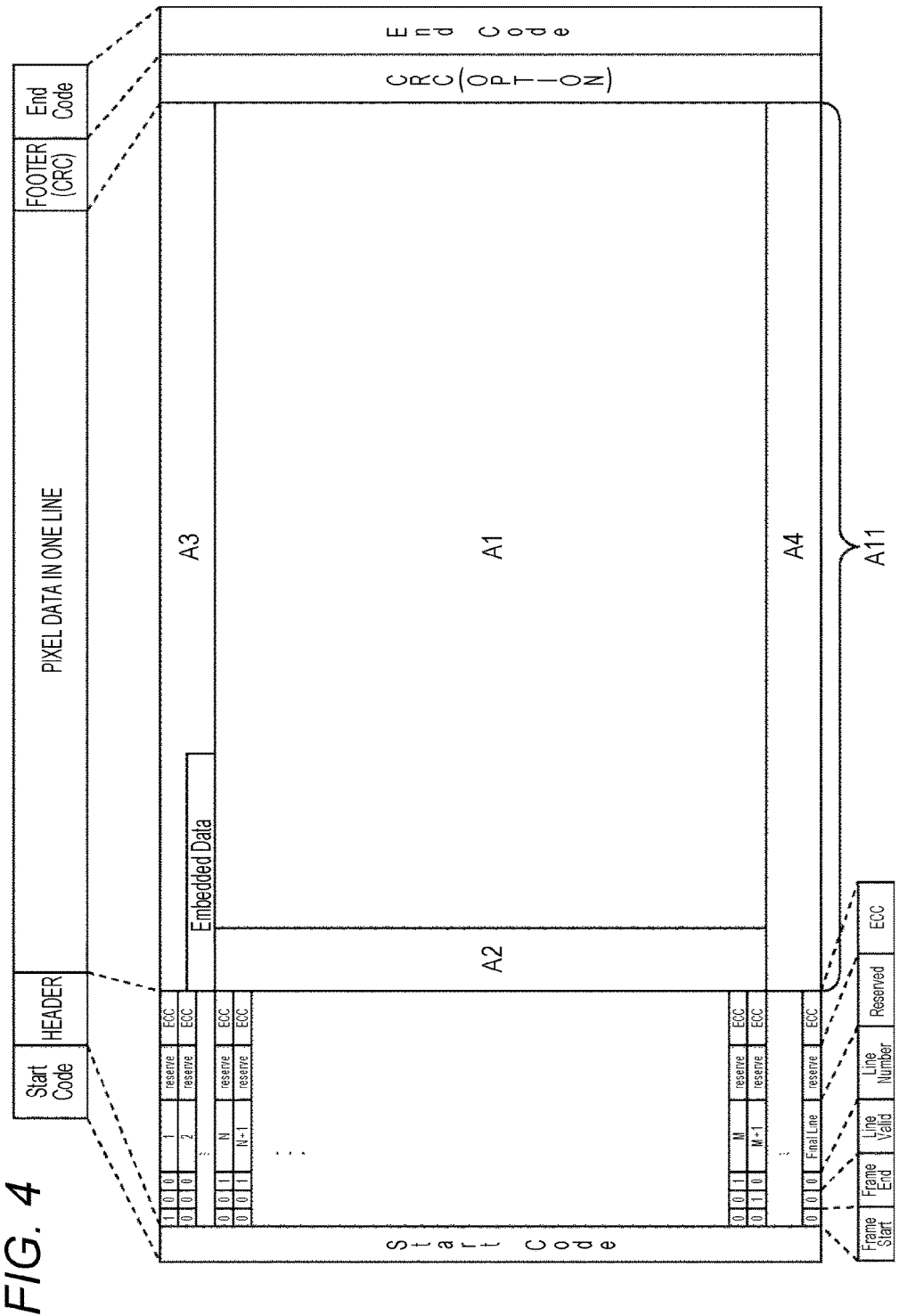
FIG. 4 is a view illustrating an example of a frame format.

Each time an image in one frame which image is imaged by the imaging unit 21 is transmitted from the image sensor 11 to the DSP 12, whole data in a format illustrated in FIG. 4 is transmitted as transmission data.

A band on an upper side in FIG. 4 illustrates a structure of a packet used for transmission of transmission data illustrated in a lower side thereof. When it is assumed that a sequence of pixels in a horizontal direction is a line, in a payload of a packet, data of the pixel in one line of the image data region A11 is stored. Transmission of the whole image data in one frame is performed by using packets more than the number of pixels in the vertical direction of the image data region A11.

When a header and a footer are added to the payload which stores the pixel data in one line, one packet is configured. As described later, the header includes additional information, such as a Frame Start, a Frame End, Line Valid, a Line Number, or an ECC, of the pixel data stored in the payload. To each packet, at least a Start Code and an End Code, which are control codes, are added.

In such manner, by employing a format to transmit pixel data in an image in one frame by each line, it becomes possible to transmit additional information such as a header or a control code such as a Start Code or an End Code during a blanking period of each line.

<Configuration of Transmission Unit 22 and Reception Unit 31

Next, with reference to FIG. 5, a configuration example of each of the transmission unit 22 and the reception unit 31 will be described.

Figure 5:
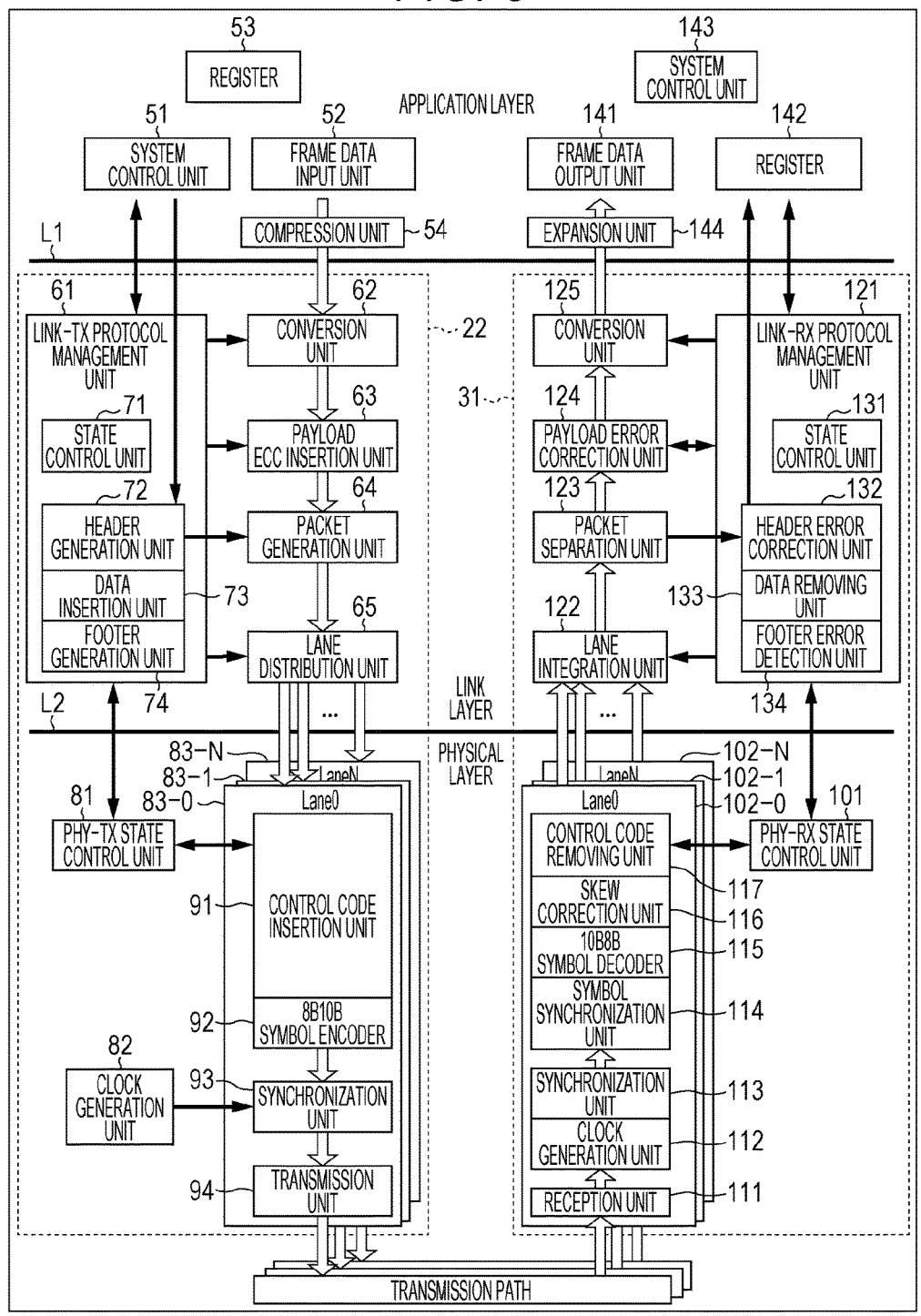
FIG. 5 is a view illustrating a configuration example of each of a transmission unit and a reception unit.

A configuration illustrated by being surrounded by a broken line on a left side in FIG. 5 is a configuration of the transmission unit 22 and a configuration illustrated by being surrounded by a broken line on a right side is a configuration of the reception unit 31. Each of the transmission unit 22 and the reception unit 31 includes a configuration of a link layer and a configuration of a physical layer. A configuration illustrated on an upper side of a solid line L2 is a configuration of the link layer and a configuration illustrated on a lower side of the solid line L2 is a configuration of the physical layer.

Note that a configuration illustrated on an upper side of a solid line L1 is a configuration of an application layer. A system control unit 51, a frame data input unit 52, a register 53, and a compression unit 54 are realized in the imaging unit 21. The system control unit 51 performs communication with a LINK-TX protocol management unit 61 of the transmission unit 22 and controls transmission of image data, for example, by providing information related to a frame format. The frame data input unit 52 performs imaging according to a command by a user or the like and supplies data of each pixel included in an image acquired by performance of the imaging to a conversion unit 62 of the transmission unit 22 through the compression unit 54. The compression unit 54 compresses the number of bits of the data of each pixel into the predetermined number of bits and supplies the compressed data of the pixel to the conversion unit 62 of the transmission unit 22. The register 53 stores information such as a compression rate in the compression unit 54, the number of bits of conversion in the conversion unit 62, and the number of Lanes. Transmission processing of image data compressed according to the information stored in the register 53 is performed.

Also, a frame data output unit 141, a register 142, a system control unit 143, and an expansion unit 144 in the configuration of the application layer are realized in the image processing unit 32. Based on pixel data which is pixel data of each line supplied by the reception unit 31 and which is expanded by the expansion unit 144, the frame data output unit 141 generates and outputs an image in one frame. By using the image output from the frame data output unit 141, various kinds of processing is performed. The register 142 stores various set values related to reception of image data such as an expansion rate in the expansion unit 144, the number of bits of conversion in a conversion unit 125, and the number of Lanes. Reception processing of image data is performed according to the information stored in the register 142. The system control unit 143 performs communication with a LINK-RX protocol management unit 121 and controls a sequence such as a mode change.

The expansion unit 144 expands pixel data in each line according to a compression rate in the compression unit 54. Also, the system control unit 51 of the image sensor 11 and the system control unit 143 of the DSP 12 transmit/receive information, which is stored in the register 53, such as a compression rate in the compression unit 54, a compression rate to which the expansion unit 144 corresponds, the number of bits of conversion in each of the conversion units 62 and 125, and the number of Lanes by serial communication and respectively set the information into the registers 53 and 142. Here, based on an operation signal to receive an input of a user (not illustrated), the system control unit 143 of the DSP 12 receives information such as the number of bits of the original image data format or the number of bits of the compression data format and sets a compression rate to be set with respect to the system control unit 51 of the image sensor 11 and a conversion rate in each of the conversion units 62 and 125. Also, the system control unit 143 sets a compression rate according to an imaging condition. That is, in a case of performing imaging with high sensitivity by international organization for standardization (ISO) sensitivity of the imaging by the imaging unit 21, an influence by a noise is received easily, and thus, the system control unit 143 performs setting in such a manner that a compression rate of the pixel data format becomes low. Inversely, in a case of low sensitivity, an influence of the noise is small, and thus, the system control unit 143 sets a high compression rate.

First, a configuration of a link layer of the transmission unit 22 will be described.

To the transmission unit 22, a LINK-TX protocol management unit 61, a conversion unit 62, a payload ECC insertion unit 63, a packet generation unit 64, and a Lane distribution unit 65 are provided as a configuration of the link layer. The LINK-TX protocol management unit 61 includes a state control unit 71, a header generation unit 72, a data insertion unit 73, and a footer generation unit 74.

The state control unit 71 of the LINK-TX protocol management unit 61 manages a state of the link layer of the transmission unit 22.

The header generation unit 72 generates a header to be added to a payload storing pixel data in one line and outputs the generated header to the packet generation unit 64.

Figure 6:
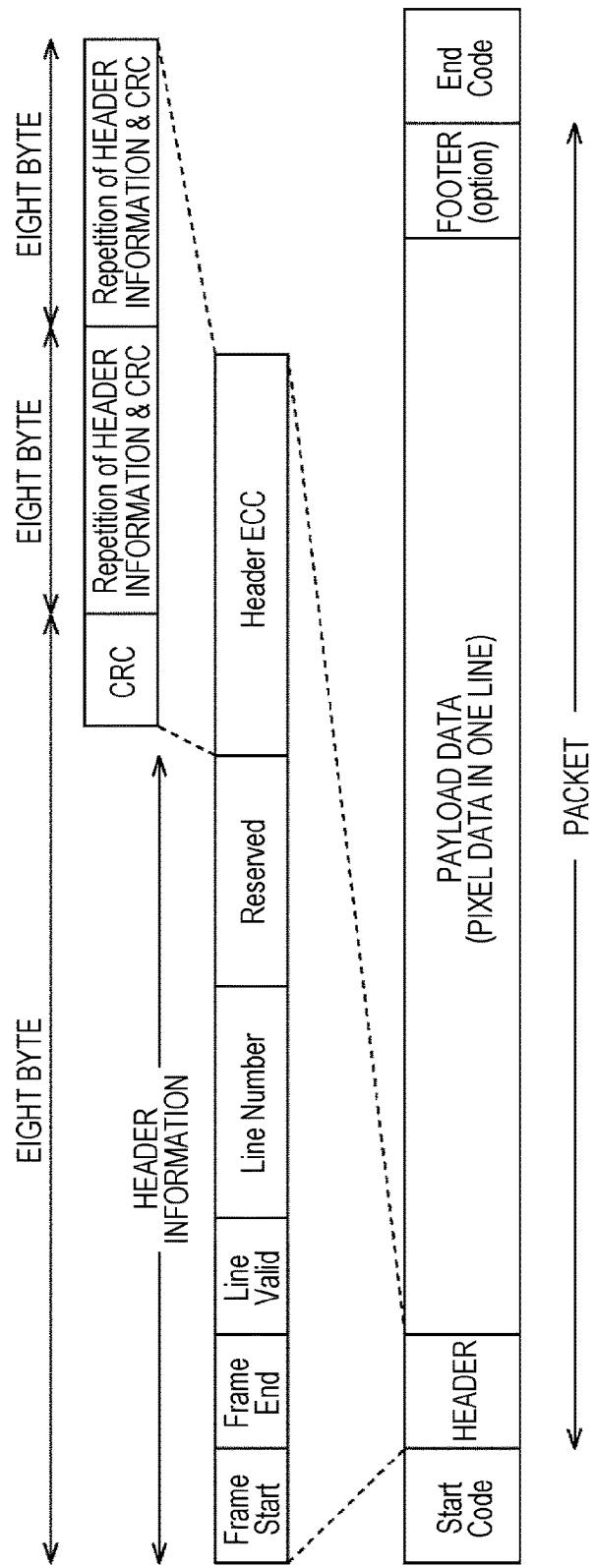
FIG. 6 is a view illustrating a header structure.

FIG. 6 is a view illustrating a structure of the header generated by the header generation unit 72.

As described above, the whole one packet includes a header and payload data which is pixel data in one line. There is a case where a footer is added to the packet. The header includes header information and a Header ECC.

The header information includes a Frame Start, a Frame End, Line Valid, a Line Number, and Reserved. Contents and an information amount of each piece of information are illustrated in FIG. 7.

The Frame Start is one-bit information indicating a head of the frame. In a Frame Start of a header of a packet used for transmission of pixel data in a first line in the image data region A11 in FIG. 4, a value of 1 is set. In a Frame Start of a header of a packet used for transmission of pixel data in each of the other lines, a value of 0 is set.

The Frame End is one-bit information indicating an end of the frame. In a Frame End of a header of a packet including, in a payload, pixel data in an end line in the effective pixel region A1, a value of 1 is set. In a Frame End of a header of a packet used for transmission of pixel data in each of the other lines, a value of 0 is set.

The Frame Start and the Frame End are frame information which is information related to a frame.

The Line Valid is one-bit information indicating whether a line of pixel data stored in a payload is a line of an effective pixel. In Line Valid of a header of a packet used for transmission of pixel data in a line in the effective pixel region A1, a value of 1 is set. In Line Valid of a header of a packet used for transmission of pixel data in each of the other lines, a value of 0 is set.

The Line Number is 13-bit information indicating a line number of a line including pixel data stored in a payload.

The Line Valid and the Line Number are line information which is information related to a line.

The Reserved is a 32-bit region for expansion. A data amount of the whole header information is six bytes.

As illustrated in FIG. 6, in a Header ECC arranged next to the header information, a cyclic redundancy check (CRC) code which is a two-byte error detection code calculated based on six-byte header information is included. Also, in the Header ECC, two pieces of information each of which is identical to eight-byte information which information is a pair of header information and a CRC code are included next to the CRC code.

That is, in a header of one packet, three same pairs of header information and a CRC code are included. A data amount of the whole header is 24 bytes which is the total of eight bytes of the first pair of header information and a CRC code, eight bytes of the second pair of header information and a CRC code, and eight bytes of the third pair of header information and a CRC code.

FIG. 8 is a view illustrating an example of an eight-byte bit array which configures a pair of header information and a CRC code.

In a byte H7 which is the first one byte of eight bytes which configures a header, one bit of each of the Frame Start, the Frame End, and the Line Valid and first to fifth bits of 13 bits of the Line Number are serially included from the first bit. Also, in a byte H6 which is the second one byte, sixth to 13th bits of 13 bits of the Line Number are included.

From a byte H5 which is the third one byte to a byte H2 which is the sixth one byte are the Reserved. In a byte H1 which is the seventh one byte and in a byte H0 which is the eighth one byte, each bit of the CRC code is included.

Referring back to description of FIG. 5, the header generation unit 72 generates header information according to control by the system control unit 51. For example, from the system control unit 51, information indicating a line number of pixel data output from the frame data input unit 52 or information indicating a head and an end of a frame is supplied.

Also, the header generation unit 72 applies the header information to a generator polynomial and calculates a CRC code. A generator polynomial of a CRC code which generator polynomial is applied to the header information is expressed, for example, by the following formula (1).

[Mathematical Formula 1]

$$CRC16 = X^{16} + X^{15} + X^2 + 1 \quad (1)$$

The header generation unit 72 generates a pair of header information and a CRC code by adding the CRC code to the header information. By repeatedly arranging the same pair of header information and a CRC code for three times, the header generation unit 72 generates a header. The header generation unit 72 outputs the generated header to the packet generation unit 64.

The data insertion unit 73 generates data used for stuffing and outputs the generated data to the conversion unit 62 and the Lane distribution unit 65. Payload stuffing data which is the stuffing data supplied to the conversion unit 62 is added to pixel data converted by the conversion unit 62 and is used for adjustment of an amount of pixel data stored in a payload. Also, Lane stuffing data which is the stuffing data supplied to the Lane distribution unit 65 is added to Lane-assigned data and is used for adjustment of a data amount between Lanes.

According to control by the system control unit 51, the footer generation unit 74 arbitrarily applies payload data to a generator polynomial and calculates a 32-bit CRC code. Then, the footer generation unit 74 outputs the calculated CRC code as a footer to the packet generation unit 64. A generator polynomial of the CRC code added as a footer is expressed, for example, by the following formula (2).

[Mathematical Formula 2]

$$CRC32 = X^{32} + X^{34} + X^4 + X^3 + X + 1 \quad (2)$$

The conversion unit 62 acquires compression data which is the pixel data supplied by the frame data input unit 52 and which is compressed by the compression unit 54 and converts compression data of each pixel into data in a one-byte unit. For example, compression data of a pixel value (RGB) of each pixel of an image imaged by the imaging unit 21 is expressed by the number of bits which is any of eight bits, 10 bits, 12 bits, 14 bits, and 16 bits.

The conversion unit 62 in FIG. 5 serially performs such conversion with respect to each pixel, for example, from a pixel on a left end of a line. Also, the conversion unit 62 generates payload data by adding the payload stuffing data supplied by the data insertion unit 73 to compression data in a byte-unit which data is acquired by conversion and outputs the generated payload data to the payload ECC insertion unit 63.

The compression data converted by the conversion unit 62 is grouped into the predetermined number of groups in an order acquired by the conversion.

In the link layer of the transmission unit 22, after grouping is performed in such a manner, processing is performed in parallel with respect to compression data at the same place in each group in each period prescribed by a clock signal.

As described above, in a payload of one packet, compression data corresponding to pixel data in one line is included.

After the compression data corresponding to the pixel data in one line is grouped, payload stuffing data is added in such a manner that a data length of each group becomes identical. The payload stuffing data is one-byte data.

Based on the payload data supplied by the conversion unit 62, the payload ECC insertion unit 63 calculates an error correction code used for error correction of payload data and inserts parity which is the calculated error correction code into the payload data. As an error correction code, for example, a Reed-Solomon code is used. Note that insertion of the error correction code is optional. For example, only one of insertion of parity performed by the payload ECC insertion unit 63 and adding of a footer performed by the footer generation unit 74 can be performed.

The payload ECC insertion unit 63 outputs payload data into which the parity is inserted to the packet generation unit 64. When insertion of the parity is not performed, the payload data supplied by the conversion unit 62 to the payload ECC insertion unit 63 is output to the packet generation unit 64 as it is.

The packet generation unit 64 generates a packet by adding the header generated by the header generation unit 72 to the payload data supplied by the payload ECC insertion unit 63. When generation of a footer is performed by the footer generation unit 74, the packet generation unit 64 also adds the footer to the payload data.

The packet generation unit 64 outputs packet data which is data included in the generated one packet to the Lane distribution unit 65. With respect to the Lane distribution unit 65, packet data including header data and payload data, packet data including header data, payload data, and footer data, or packet data including header data and payload data into which parity is inserted is supplied. A packet structure in FIG. 6 is logical. In the link layer and the physical layer, data of a packet including the structure in FIG. 6 is processed in a byte-unit.

The Lane distribution unit 65 assigns the packet data, which is data supplied by the packet generation unit 64, to each Lane used for data transmission among Lanes 0 to 7 in an order from data at a head.

The Lane distribution unit 65 outputs, to the physical layer, the packet data assigned to each Lane in such a manner. In the following, a case where data is transmitted by using eight Lanes of the Lanes 0 to 7 will be mainly described. However, even in a case where the number of Lanes used for data transmission is a different number, similar processing is performed.

Next, a configuration of a physical layer of the transmission unit 22 will be described.

To the transmission unit 22, a PHY-TX state control unit 81, a clock generation unit 82, signal processing units 83-0 to 83-N are provided as a configuration of the physical layer. The signal processing unit 83-0 includes a control code insertion unit 91, an 8B10B symbol encoder 92, a synchronization unit 93, and a transmission unit 94. Packet data output from the Lane distribution unit 65 and assigned to the Lane 0 is input into the signal processing unit 83-0 and packet data assigned to the Lane 1 is input into the signal processing unit 83-1. Also, packet data assigned to a Lane N is input into the signal processing unit 83-N.

In such a manner, in the physical layer of the transmission unit 22, the signal processing units 83-0 to 83-N are provided, the number thereof being the same with the number of Lanes. Processing of packet data transmitted by using each Lane is performed in parallel in the signal processing units 83-0 to 83-N. A configuration of the signal processing unit 83-0 will be described. Each of the signal processing units 83-1 to 83-N includes a similar configuration.

The PHY-TX state control unit 81 controls each unit of the signal processing units 83-0 to 83-N. For example, timing of each kind of processing performed by the signal processing units 83-0 to 83-N is controlled by the PHY-TX state control unit 81.

The clock generation unit 82 generates a clock signal and outputs the generated clock signal to a synchronization unit 93 of each of the signal processing units 83-0 to 83-N.

The control code insertion unit 91 of the signal processing unit 83-0 adds a control code to the packet data supplied by the Lane distribution unit 65. A control code is a code expressed by one symbol selected from a previously-prepared plurality of kinds of symbols or a combination of a plurality of kinds of symbols. Each symbol inserted by the control code insertion unit 91 is eight-bit data. 8B10B conversion is performed in a circuit in the following stage, whereby, one symbol inserted by the control code insertion unit 91 becomes 10-bit data. On the other hand, as described later, 10B8B conversion is performed with respect to reception data in the reception unit 31. Each symbol before the 10B8B conversion which symbol is included in the reception data is 10-bit data and each symbol after the 10B8B conversion is eight-bit data.

As a control code, there are an Idle Code, a Start Code, an End Code, a Pad Code, an Sync Code, a Deskew Code, and an Standby Code.

The Idle Code is a symbol group repeatedly transmitted in a period other than transmission of packet data. The Idle Code is expressed by D00.0 (00000000) of a D Character which is an 8B10B Code.

The Start Code is a symbol group indicating a start of a packet. As described above, the Start Code is added in front of the packet. The Start Code is expressed by four symbols of K28.5, K27.7, K28.2, and K27.7 which are in a combination of three kinds of K Characters.

The End Code is a symbol group indicating an end of a packet. As described above, the End Code is added behind the packet. The End Code is expressed by four symbols of K28.5, K29.7, K30.7, and K29.7 which are in a combination of three kinds of K Characters.

The Pad Code is a symbol group inserted into payload data in order to fill a gap between a pixel data band and a PHY transmission band. The pixel data band is a transmission rate of compressed pixel data output from the imaging unit 21 and input into the transmission unit 22 and the PHY transmission band is a transmission rate of compressed pixel data transmitted from the transmission unit 22 and input into the reception unit 31. The Pad Code is four symbols of K23.7, K28.4, K28.6, and K28.7 which are in a combination of four kinds of K Characters.

Insertion of the Pad Code into the payload data assigned to the Lane 0 is performed by the control code insertion unit 91 of the signal processing unit 83-0. Similarly, insertion of the Pad Code into payload data assigned to a different Lane is performed at the same timing by each of the signal processing units 83-1 to 83-N. The number of Pad Codes is determined based on a gap between the pixel data band and the PHY transmission band, a frequency of a clock signal generated by the clock generation unit 82, or the like.

In such a manner, when the pixel data band is narrow and the PHY transmission band is wide, the Pad Code is inserted to adjust a gap between the both bands. For example, since the Pad Code is inserted, adjustment is performed in such a manner that the gap between the pixel data band and the PHY transmission band fits in a certain range.

The Sync Code is a symbol group used to secure bit synchronization and symbol synchronization between the transmission unit 22 and the reception unit 31. The Sync Code is expressed by two symbols which are K28.5 and Any. Any indicates that any kind of symbol may be used. The Sync Code is repeatedly transmitted, for example, in a training mode before transmission of packet data is started between the transmission unit 22 and the reception unit 31.

The Deskew Code is a symbol group used for correction of Data Skew between Lanes, that is, a gap in reception timing of data received in each Lane of the reception unit 31. The Deskew Code is expressed by two symbols which are K28.5 and Any**. Correction of Data Skew between Lanes by using the Deskew Code will be described later.

The Standby Code is a symbol group used to notify the reception unit 31 that an output from the transmission unit 22 becomes a state such as High-Z (high impedance) and data transmission is not performed any more. That is, the Standby Code is transmitted to the reception unit 31 when the transmission of the packet data is ended and a state becomes a Standby state. The Standby Code is expressed by two symbols which are K28.5 and Any**.

The control code insertion unit 91 outputs, to the 8B10B symbol encoder 92, packet data to which such a control code is added.

The 8B10B symbol encoder 92 performs the 8B10B conversion with respect to the packet data (packet data to which control code is added) supplied by the control code insertion unit 91 and outputs, to the synchronization unit 93, packet data converted into data in a 10-bit unit.

The synchronization unit 93 outputs each bit of the packet data, which is supplied by the 8B10B symbol encoder 92, to the transmission unit 94 according to the clock signal generated by the clock generation unit 82.

The transmission unit 94 transmits the packet data, which is supplied by the synchronization unit 93, to the reception unit 31 through a transmission path included in the Lane 0. In a case of performing data transmission by using eight Lanes, packet data is also transmitted to the reception unit 31 by using transmission paths included in the Lanes 1 to 7.

Next, a configuration of a physical layer of the reception unit 31 will be described.

To the reception unit 31, a PHY-RX state control unit 101 and signal processing units 102-0 to 102-N are provided as a configuration of the physical layer. The signal processing unit 102-0 includes a reception unit 111, a clock generation unit 112, a synchronization unit 113, a symbol synchronization unit 114, a 10B8B symbol decoder 115, a skew correction unit 116, and a control code removing unit 117. Packet data transmitted through a transmission path included in the Lane 0 is input into the signal processing unit 102-0 and packet data transmitted through a transmission path included in the Lane 1 is input into the signal processing unit 102-1. Also, packet data transmitted through a transmission path included in the Lane N is input into the signal processing unit 102-N.

In such a manner, in the physical layer of the reception unit 31, the signal processing units 102-0 to 102-N are provided, the number thereof being the same with the number of Lanes. Processing of packet data transmitted by using each Lane is performed in parallel in the signal processing units 102-0 to 102-N. A configuration of the signal processing unit 102-0 will be described. Each of the signal processing units 102-1 to 102-N includes a similar configuration.

The reception unit 111 receives a signal indicating the packet data transmitted from the transmission unit 22 through the transmission path included in the Lane 0 and outputs the signal to the clock generation unit 112.

By detecting an edge of the signal supplied by the reception unit 111, the clock generation unit 112 performs bit synchronization and generates a clock signal based on a detection cycle of the edge. The clock generation unit 112 outputs the signal, which is supplied by the reception unit 111, to the synchronization unit 113 along with the clock signal.

According to the clock signal generated by the clock generation unit 112, the synchronization unit 113 performs sampling of the signal received in the reception unit 111 and outputs packet data acquired by the sampling to the symbol synchronization unit 114. A function of clock data recovery (CDR) is realized by the clock generation unit 112 and the synchronization unit 113.

By detecting a control code included in the packet data or by detecting a part of a symbol included in the control code, the symbol synchronization unit 114 performs symbol synchronization. For example, the symbol synchronization unit 114 detects a symbol of K28.5 included in each of the Start Code, the End Code, and the Deskew Code and performs the symbol synchronization. The symbol synchronization unit 114 outputs packet data which indicates each symbol and which is in a 10-bit unit to the 10B8B symbol decoder 115.

Also, by detecting a boundary of a symbol included in the Sync Code repeatedly transmitted from the transmission unit 22 in the training mode before the transmission of the packet data is started, the symbol synchronization unit 114 performs the symbol synchronization.

The 10B8B symbol decoder 115 performs the 10B8B conversion with respect to the packet data in a 10-bit unit which data is supplied by the symbol synchronization unit 114 and outputs packet data converted into data in an eight-bit unit to the skew correction unit 116.

The skew correction unit 116 detects the Deskew Code from the packet data supplied by the 10B8B symbol decoder 115. Information of detection timing of the Deskew Code which detection is performed by the skew correction unit 116 is supplied to the PHY-RX state control unit 101.

Also, the skew correction unit 116 corrects the Data Skew between Lanes in such a manner that timing of the Deskew Code matches timing indicated by the information supplied by the PHY-RX state control unit 101. By the PHY-RX state control unit 101, information indicating the latest timing in timing of the Deskew Code detected in each of the signal processing units 102-0 to 102-N is supplied.

Similar processing is performed in each of the signal processing units 102-1 to 102-N, whereby the Data Skew between the Lanes is corrected.

The skew correction unit 116 outputs packet data, in which the Data Skew is corrected, to the control code removing unit 117.

The control code removing unit 117 removes the control code added to the packet data and outputs, as packet data, data from the Start Code to the End Code to the link layer.

The PHY-RX state control unit 101 controls each unit of the signal processing units 102-0 to 102-N and performs, for example, correction of Data Skew between Lanes. Also, when an transmission error is caused in a predetermined Lane and a control code is lost, the PHY-RX state control unit 101 performs error correction of the control code by adding a control code, which is transmitted in a different Lane, instead of the lost control code.

Next, a configuration of a link layer of the reception unit 31 will be described.

To the reception unit 31, a LINK-RX protocol management unit 121, a Lane integration unit 122, a packet separation unit 123, a payload error correction unit 124, and a conversion unit 125 are provided as a configuration of the link layer. The LINK-RX protocol management unit 121 includes a state management unit 131, a header error correction unit 132, a data removing unit 133, and a footer error detection unit 134.

The Lane integration unit 122 performs integration by sorting pieces of packet data, which is supplied by the signal processing units 102-0 to 102-N in the physical layer, in an opposite order of an order of distribution to each Lane by the Lane distribution unit 65 of the transmission unit 22.

The packet separation unit 123 separates the packet data of one packet, which data is integrated by the Lane integration unit 122, into packet data included in header data and packet data included in payload data. The packet separation unit 123 outputs the header data to the header error correction unit 132 and outputs the payload data to the payload error correction unit 124.

Also, when a footer is included in the packet, the packet separation unit 123 separates data of one packet into packet data included in header data, packet data included in payload data, and packet data included in footer data. The packet separation unit 123 outputs the header data to the header error correction unit 132 and outputs the payload data to the payload error correction unit 124. Also, the packet separation unit 123 outputs the footer data to the footer error detection unit 134.

When parity is inserted into the payload data supplied by the packet separation unit 123, the payload error correction unit 124 detects an error in the payload data and corrects the detected error by performing error correction calculation based on the parity.

The payload error correction unit 124 outputs, to the conversion unit 125, compression data of the pixel data after the error correction which data is acquired by error correction on each of a Basic Block and an Extra Block. When parity is not inserted into the payload data supplied by the packet separation unit 123, the payload data supplied by the packet separation unit 123 is output to the conversion unit 125 as it is.

According to control by the data removing unit 133, the conversion unit 125 removes payload stuffing data included in the payload data supplied by the payload error correction unit 124.

Also, the conversion unit 125 converts compression data of each piece of pixel data in a byte-unit, which piece of data is acquired by removing the payload stuffing data, into compression data in a unit of eight bits, 10 bits, 12 bits, 14 bits, or 16 bits. In the conversion unit 125, inverse conversion of the conversion performed by the conversion unit 62 of the transmission unit 22 is performed.

The conversion unit 125 outputs the compressed pixel data in a unit of eight bits, 10 bits, 12 bits, 14 bits, or 16 bits, which pixel data is acquired by the conversion, to the frame data output unit 141 through the expansion unit 144. Here, the expansion unit 144 performs expansion processing of the compressed pixel data and decompresses original pixel data. Then the expansion unit 144 outputs the decompressed pixel data to the frame data output unit 141. For example, in the frame data output unit 141, each line of an effective pixel specified by Line Valid of header information is generated based on the pixel data acquired by the conversion unit 125 and each line is lined up according to a Line Number in the header information, whereby an image in one frame is generated.

The state management unit 131 of the LINK-RX protocol management unit 121 manages a state of the link layer of the reception unit 31.

Based on the header data supplied by the packet separation unit 123, the header error correction unit 132 acquires three pairs of header information and a CRC code. The header error correction unit 132 performs error detection calculation which is calculation to detect an error in the header information with respect to each pair of header information and a CRC code by using the CRC code in the same pair with the header information.

Also, based on at least one of an error detection result of header information of each pair and a comparison result of data which result is acquired by the error detection calculation, the header error correction unit 132 estimates correct header information and outputs header information, which is estimated as the correct information, and a decoding result. The data calculated by the error detection calculation is a value calculated by applying a generator polynomial of the CRC to the header information. Also, the decoding result is information indicating that decoding is successful or unsuccessful.

The three pairs of header information and a CRC code are respectively referred to as a pair 1, a pair 2, and a pair 3. In this case, by error detection calculation with respect to the pair 1, the header error correction unit 132 acquires information whether there is an error in header information of the pair 1 (error detection result) and data 1 which is data calculated by the error detection calculation. Also, by error detection calculation with respect to the pair 2, the header error correction unit 132 acquires information whether there is an error in header information of the pair 2 and data 2 which is data calculated by the error detection calculation. By error detection calculation with respect to the pair 3, the header error correction unit 132 acquires information whether there is an error in header information of the pair 3 and data 3 which is data calculated by the error detection calculation.

Also, the header error correction unit 132 determines whether the data 1 and the data 2 are identical to each other, whether the data 2 and the data 3 are identical to each other, and whether the data 3 and the data 1 are identical to each other.

For example, when no error is detected in error detection calculation with respect to any of the pair 1, the pair 2, and the pair 3 and when comparison results of any pieces of data calculated by the error detection calculation are identical to each other, the header error correction unit 132 selects, as a decoding result, information indicating that the decoding is successful. Also, the header error correction unit 132 estimates that any piece of header information is correct and selects one of header information of the pair 1, header information of the pair 2, and header information of the pair 3 as output information.

On the other hand, when no error is detected only in the error detection calculation with respect to the pair 1, the header error correction unit 132 selects, as a decoding result, information indicating that the decoding is successful and estimates that the header information of the pair 1 is correct. Then, the header error correction unit 132 selects the header information of the pair 1 as output information.

Also, when no error is detected only in the error detection calculation with respect to the pair 2, the header error correction unit 132 selects, as a decoding result, information indicating that the decoding is successful and estimates that the header information of the pair 2 is correct. Then, the header error correction unit 132 selects the header information of the pair 2 as output information.

When no error is detected only in the error detection calculation with respect to the pair 3, the header error correction unit 132 selects, as a decoding result, information indicating that the decoding is successful and estimates that the header information of the pair 3 is correct. Then, the header error correction unit 132 selects the header information of the pair 3 as output information.

The header error correction unit 132 outputs and stores, into the register 142, the decoding result and the output information which are selected in the above-described manner. In such a manner, header information with no error is detected from a plurality of pieces of header information by using a CRC code and the detected header information is output, whereby error correction of header information by the header error correction unit 132 is performed.

The data removing unit 133 removes Lane stuffing data by controlling the Lane integration unit 122 and removes payload stuffing data by controlling the conversion unit 125.

Based on the footer data supplied by the packet separation unit 123, the footer error detection unit 134 acquires a CRC code stored in the footer. By using the acquired CRC code, the footer error detection unit 134 performs error detection calculation and detects an error in the payload data. The footer error detection unit 134 outputs and stores the error detection result into the register 142.

<Operation of Image Sensor 11 and DSP 12>

Next, a series of processing in the transmission unit 22 and the reception unit 31 each of which includes the above described configuration will be described.

Figure 9:
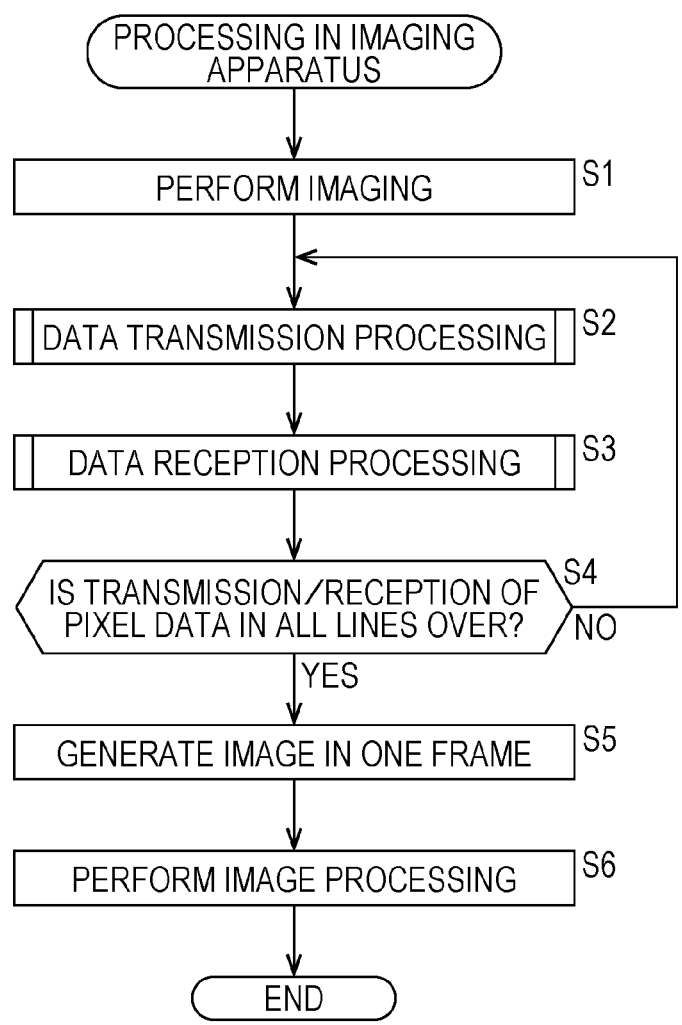
FIG. 9 is a flowchart for describing processing in an imaging apparatus.

First, with reference to a flowchart in FIG. 9, an operation of an imaging apparatus including the transmission system 1 will be described. The processing in FIG. 9 is started when it is commanded to start imaging, for example, by pressing of a shutter button provided on the imaging apparatus.

In step S1, the imaging unit 21 of the image sensor 11 performs imaging. After converting pixel data included in an image in one frame, which image is acquired by the imaging, into compression data with the compression unit 54 serially by data in one pixel, the frame data input unit 52 (FIG. 5) of the imaging unit 21 outputs the converted data to the transmission unit 22.

In step S2, data transmission processing is performed by the transmission unit 22. By the data transmission processing, a packet which stores, in a payload, pixel data in one line is generated and packet data included in the packet is transmitted to the reception unit 31. The data transmission processing will be described later with reference to a flowchart in FIG. 10.

In step S3, data reception processing is performed by the reception unit 31. By the data reception processing, the packet data transmitted from the transmission unit 22 is received and compression data of the pixel data stored in the payload is output to the image processing unit 32. The data reception processing will be described later with reference to a flowchart in FIG. 12.

The data transmission processing performed by the transmission unit 22 in step S2 and the data reception processing performed by the reception unit 31 in step S3 are performed alternately with respect to the pixel data in one line. That is, when pixel data in one certain line is transmitted by the data transmission processing, the data reception processing is performed. When the pixel data in the one line is received by the data reception processing, the data transmission processing is performed with respect to pixel data in a next one line. There is a case where the data transmission processing by the transmission unit 22 and the data reception processing by the reception unit 31 are arbitrarily performed in temporally parallel. In step S4, the frame data output unit 141 of the image processing unit 32 determines whether transmission/reception of pixel data in all lines included in the image in the one frame is over. When it is determined that the transmission/reception is not over, the processing after step S2 is repeatedly performed.

When it is determined in step S4 that the transmission/reception of the pixel data in all lines included in the image in one frame is over, the frame data output unit 141 of the image processing unit 32 generates an image in one frame in step S5 based on the pixel data supplied by the reception unit 31.

In step S6, the image processing unit 32 performs image processing by using the image in the one frame and ends the processing.

<Data Transmission Processing>

Figure 10:
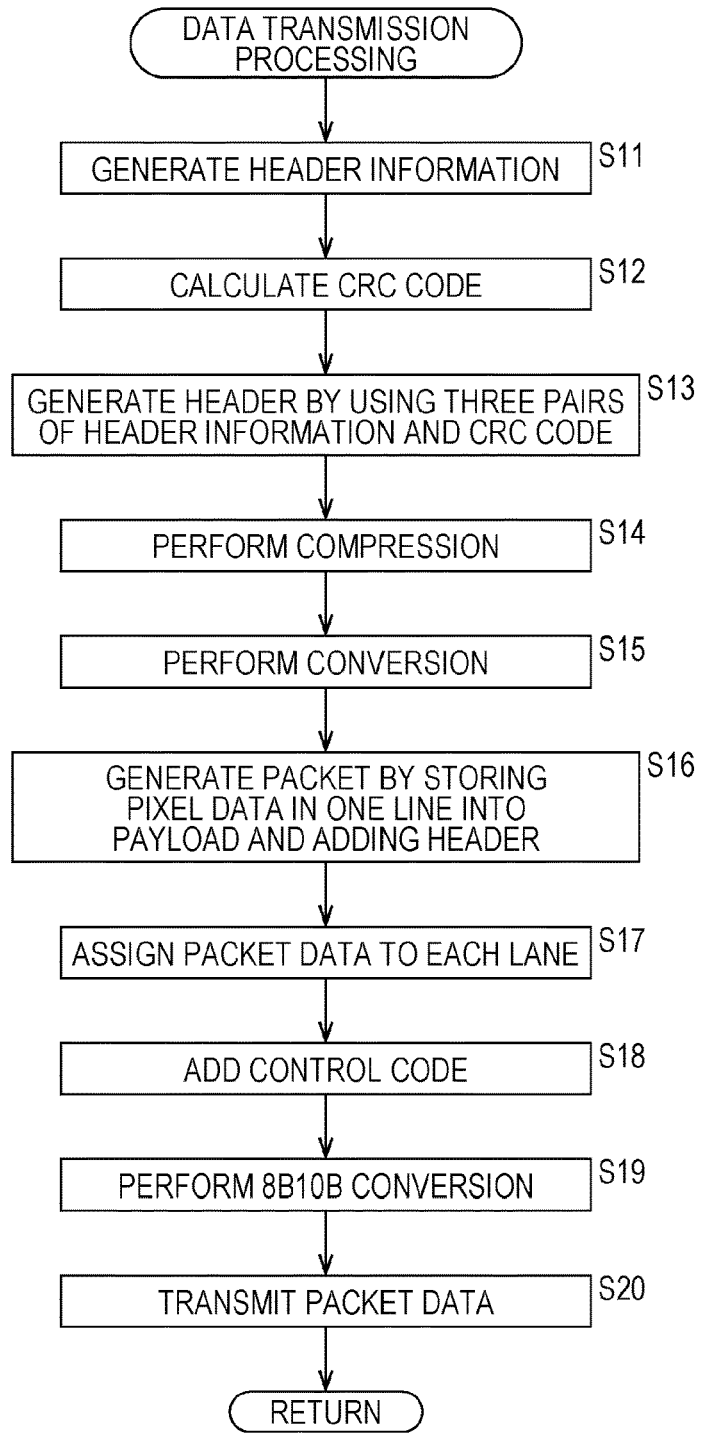
FIG. 10 is a flowchart for describing data transmission processing performed in step S2 in FIG. 9.

Next, with reference to a flowchart in FIG. 10, the data transmission processing performed in step S2 in FIG. 9 will be described. Note that in FIG. 9, a description has been made on the assumption that pixel data is supplied to the conversion unit 62 in the processing in step S1 after being compressed. As a matter of convenience of a description, the description will be made on the assumption that processing to compress data of a pixel into compression data is included in the data transmission processing. Thus, in step S1, processing until pixel data is supplied to the compression unit 54 is performed.

In step S11, the header generation unit 72 generates header information including a Frame Start, a Frame End, Line Valid, a Line Number, and Reserved.

In step S12, the header generation unit 72 applies the header information to a generator polynomial and calculates a CRC code.

In step S13, the header generation unit 72 generates a pair of header information and a CRC code by adding the CRC code to the header information. By repeatedly arranging the same pair of header information and a CRC code for three times, the header generation unit 72 generates a header.

In step S14, the compression unit 54 compresses the image supplied by the frame data input unit 52 and supplies the compressed image to the conversion unit 62.

More specifically, for example, in a case where pixel data of an original image is a 12-bit original image data format and when the data format is compressed from 12 bits into six bits, the compression unit 54 compresses an original image data format illustrated in the leftmost column in FIG. 11 into what is illustrated in a second column from the left. In FIG. 11, the leftmost column is the original image data format and the second column from the left is a compression data format on which compression is performed. Also, a third column is a transmission data format converted from the compression data format in processing described later by the conversion unit 62 according to the number of Lanes. A second column from the right is a compression data format inversely converted from the transmission data format in the processing described later and the rightmost column indicates an original image data format which is an expanded compression data format. Also, in a case of the leftmost column, D_N[11] indicates an MSB and D_N[0] which is the smallest number indicates an LSB. Similar indication is made in the other lines.

That is, the compression unit 54 respectively compresses 12 bits of data D_N[0] to [11] and 12 bits of data D_N+1[0] to [11], which respectively indicate pixel data of a pixel N (Pixel4*N) and that of a pixel N+1(Pixel4*N+1) of an original image illustrated in the leftmost column in FIG. 11, into six-bit data including data COMP_N[0] to [5] and six-bit data including data COMP_N+1[0] to [5] in such a manner illustrated in the second column from the left in FIG. 11. Then, the compression unit 54 converts six-bit pieces of data of two pixels into data Data2 *N in a compression data format including a structure which is identical to that of the 12-bit original image data format corresponding to one pixel of the original image. Here, a compression data format including the compression data of two pixels which data is included in the converted data Data2*N is similar to the original image data format of one pixel in the original image. Thus, the compression data in the second column from the left in FIG. 11 is the original image data format, in which data in the compression data format of the compressed two pixels is arranged, of one pixel.

Also, similarly, as illustrated in the second column from the left in FIG. 11, 12-bit data D_N+2[0] to [11] and 12-bit data D_N+3[0] to [11] which respectively indicate pixel data of a pixel N+2 (Pixel4*N+2) and that of a pixel N+3 (Pixel4*N+3) of the original image illustrated in the leftmost column in FIG. 11 are compressed into six-bit compression data including data COMP_N+2[0] to [5] and six-bit compression data including data COMP_N+3[0] to [5]. Also, the six-bit pieces of compression data in the compression data format of two pixels are arranged in a 12-bit compression data format corresponding to data of one pixel in the original image data format, whereby conversion into data Data2*N+1 is performed.

In such a manner, in the compression unit 54, original image data in the 12-bit original image data format is compressed into a compression data format of the prescribed number of bits and is rearranged on a compression data format identical to a pixel data format of the original image. As a result, with respect to the data format, compression data in a compression data format of two pixels is recorded into a data format corresponding to one pixel while the original image data format is kept, whereby pixel data is compressed as a whole.

In step S15, the conversion unit 62 acquires the compression data which is supplied by the frame data input unit 52 and which is compressed by the compression unit 54 and performs conversion. The conversion unit 62 outputs payload data generated, for example, by grouping pixel data, which is acquired by the conversion, in a byte-unit or by performing adding of payload stuffing data. Into the payload data, parity is arbitrarily inserted by the payload ECC insertion unit 63.

That is, for example, as illustrated in the second column from the left in FIG. 11, when compression data supplied by the compression unit 54 is the data Data2 *N in a compression data format including two pieces of six-bit data which are the data COMP_N[0] to [5] and the data COMP_N+1[0] to [5] and is the data Data2*N+1 in a compression data format including two pieces of six-bit data which are the data COMP_N+2[0] to [5] and the data COMP_N+3[0] to [5], the conversion unit 62 converts the compression data Data2 *N and Data2*N+1 illustrated in the second column from the left in FIG. 11 into data Byte 3 *N to Byte3*N+2 in a transmission data format illustrated in the third column from the left in FIG. 11. That is, the conversion unit 62 arranges data COMP_N[0] to [5] and COMP_N+1[4] to [5], which is upper eight bits of the data Data2*N in the compression data format, as the data Byte3*N in the transmission data format. Next, the conversion unit 62 arranges COMP_N+2[0 ] to [5 ] and COMP_N+3[4] and [5], which are upper eight bits of the compression data Data2*N+1, as the data Byte3*N+1 in the transmission data format. Also, the conversion unit 62 arranges, as the data Byte3*N+2 in the transmission data format, the compression data COMP_N+1[0] to [3] which is lower four bits of the compression data Data2*N and the compression data COMP_N+3[0] to [3] which is lower four bits of the compression data Data2*N+1.

By the above processing, compressed pixel data is grouped into pixel data in a byte-unit.

In step S16, the packet generation unit 64 generates a packet based on payload data, which includes compression image data corresponding to pixel data in one line, and a header generated by the header generation unit 72 and outputs packet data which configures one packet.

In step S17, the Lane distribution unit 65 assigns the packet data, which is supplied by the packet generation unit 64, to a plurality of Lanes used for data transmission.

In step S18, the control code insertion unit 91 adds a control code to the packet data supplied by the Lane distribution unit 65.

In step S19, the 8B10B symbol encoder 92 performs 8B10B conversion of the packet data to which the control code is added and outputs packet data converted into data in a 10-bit unit.

In step S20, according to a clock signal generated by the clock generation unit 82, the synchronization unit 93 outputs the packet data supplied by the 8B10B symbol encoder 92 and performs transmission thereof from the transmission unit 94. The processing in steps S18 to S20 is performed in parallel by the signal processing units 83-0 to 83-N. When transmission of pixel data in one line is over, the processing goes back to step S2 in FIG. 10 and processing thereafter is performed.

<Data Reception Processing>

Figure 12:
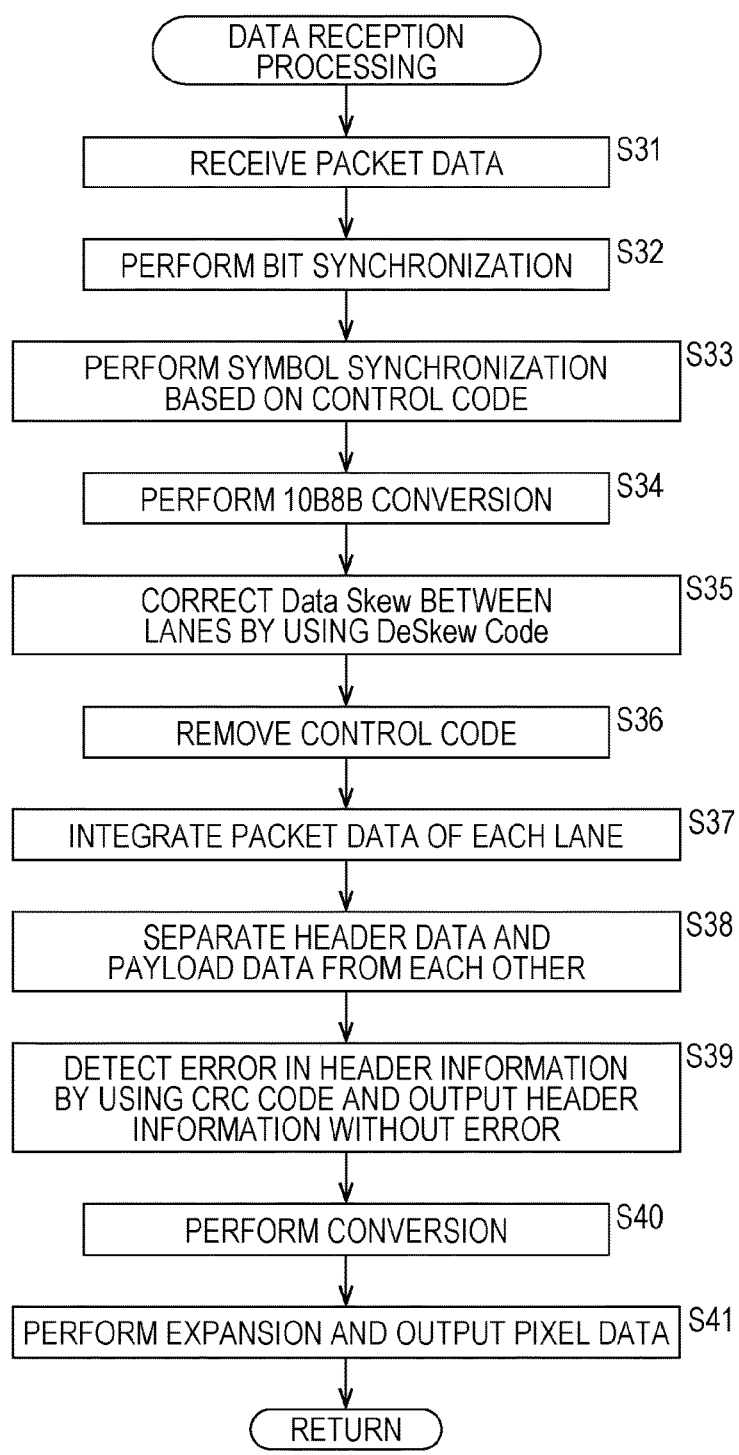
FIG. 12 is a flowchart for describing data reception processing performed in step S3 in FIG. 9.

Next, with reference to a flowchart in FIG. 12, the data reception processing performed in step S3 in FIG. 9 will be described.

In step S31, the reception unit 111 receives a signal indicating packet data transmitted from the transmission unit 22. The processing in steps S31 to S36 is performed in parallel by the signal processing units 102-0 to 102-N.

In step S32, the clock generation unit 112 performs bit synchronization by detecting an edge of the signal supplied by the reception unit 111. The synchronization unit 113 performs sampling of the signal received in the reception unit 111 and outputs packet data to the symbol synchronization unit 114.

In step S33, the symbol synchronization unit 114 performs symbol synchronization, for example, by detecting a control code included in the packet data.

In step S34, the 10B8B symbol decoder 115 performs 10B8B conversion with respect to packet data after the symbol synchronization and outputs packet data converted into data in an eight-bit unit.

In step S35, the skew correction unit 116 detects the Deskew Code. As described above, the skew correction unit 116 corrects Data Skew between Lanes in such a manner that timing of the Deskew Code matches timing indicated by the information supplied by the PHY-RX state control unit 101

In step S36, the control code removing unit 117 removes a control code added to the packet data.

In step S37, the Lane integration unit 122 integrates pieces of packet data supplied by the signal processing units 102-0 to 102-N.

In step S38, the packet separation unit 123 separates the packet data, which is integrated by the Lane integration unit 122, into packet data included in the header data and packet data included in the payload data.

In step S39, the header error correction unit 132 performs error detection calculation by using a CRC code with respect to each pair of header information and a CRC code included in the header data separated by the packet separation unit 123. Also, based on an error detection result of each pair and a comparison result of data acquired by the error detection calculation, the header error correction unit 132 selects and outputs header information with no error.

In step S40, the conversion unit 125 converts payload data into a compression data format of the prescribed number of bits in a unit of eight bits, 10 bits, 12 bits, 14 bits, or 16 bits and outputs the converted data to the expansion unit 144. Error correction using parity is arbitrarily performed by the payload error correction unit 124 with respect to payload data to be converted. Here, it is assumed that conversion into a 12-bit compression data format is performed.

Here, for example, when the payload data is the data Byte3*N to Byte3*N+2 in the transmission data format illustrated in the third column from the left in FIG. 11, the conversion unit 125 performs conversion into the compression data Data2*N and Data2*N+1 in the compression data format illustrated in the second column from the right in FIG. 11.

More specifically, by using the data COMP_N+1[0] to [5] and COMP_N+1[4] to [5] of the data Byte3*N and the data COMP_N+1[0] to [3] of the data Byte3*N+2 in the transmission data format, the conversion unit 125 rearranges the six-bit data COMP_N[0] to [5] and COMP_N+1[0] to [5] of two pixels into a compression data format identical to the 12-bit original image data format of one pixel and configures the compression data Data2 *N. Similarly, by using data COMP_N+2[0] to [5] and COMP_Ns+3[4] and [5] of the data Byte3*N+1 in the transmission data format and data COMP_N+3[0] to [3] of the data Byte3*N+2 in the transmission data format, the conversion unit 125 rearranges the six-bit data COMP_N+2[0] to [5] and COMP_N+3[0] to [5] of two pixels into the compression data format and configures the data Data2*N+1.

In step S41, the expansion unit 144 expands compression data in the compression data format, performs decompression into pixel data of the original image, and outputs the decompressed data.

Then, when processing of pixel data in one line is over, the processing goes back to step S3 in FIG. 9 and processing thereafter is performed.

More specifically, for example, when data supplied by the conversion unit 125 is the data Data2*N and Data2*N+1 each of which is configured by rearrangement of compression data which is in the compression data format of two pixels corresponding to the original image data format of one pixel and which is illustrated in the second column from the right in FIG. 11, the expansion unit 144 expands the compression data Data2*N and Data2*N+1 into 12-bit pixels Pixel4*N to Pixel4*N+3 of the original image which pixels are illustrated in the rightmost column in FIG. 11.

That is, the expansion unit 144 expands data Data2s*Ns, which is configured by arrangement of compressed data COMP_Ns[0s] to [5] and COMPs_Ns+1s[0] to [5s] of 2s pixels in a compression data format corresponding to a 12s-bit original image data format of one pixel, into data D_Ns[0] to [11s] and data Ds_N+1s[0] to [11s] in the 12-bit original image data format of 2s pixels and outputs the expanded data as pixel data Pixel4s*Ns and Pixel4s*N+1s in the 12s-bit original image data format of one pixel. Also, similarly, the expansion unit 144 expands data Data2s*Ns+1, which is configured by arrangement of compressed data COMP_Ns+2[0s] to [5s] and COMPs_N+3s[0] to [5s] of 2s pixels in a compression data format corresponding to a 12-bit original image data format of is pixel, into pixel data Ds_N+2s[0s] to [11] and pixel data D_Ns+3s[0] to [11s] in the 12-bit original image data format and outputs the expanded data as pixel data Pixel4s*Ns+2 and Pixel4s*N+3s in the 12-bit original image data format of is pixel.

As described above, data transmission between the image sensor 11 and the DSP 12 is performed by using a packet format in which one line in is frame corresponds to one packet.

It can be said that a packet format used for data transmission between an image sensor 11s and the DSP 12 is a format to control transmission of header information or a control code, which indicates a packet boundary, such as Start Codes or End Codes at minimum and can prevent transmission efficiency from being decreased. When a packet format in which pixel data stored into a payload of one packet is less than that in is line is employed, it is necessary to transmit more packets to transmit pixel data in one whole frame. Since the number of pieces of header information or the number of control codes to be transmitted is increased, transmission efficiency is decreased.

Also, it becomes possible to control transmission latency by preventing a decrease in transmission efficiency and to realize an interface with high pixel/high frame rate in which interface it is necessary to transmit a large amount of image data at high speed.

By employing a packet format in which it is assumed that reliability/redundancy of transmission is increased and error correction is performed on a side of the reception unit 31, it becomes possible to secure a countermeasure for an error in transmission of header information. Since transmission of synchronization information of Frame/Line (Vs/H) or the like is performed by using the header information, a significant trouble may be caused in a system when the header information is lost due to the transmission error. However, such a trouble can be prevented.

Also, it is possible to control an increase in an implementation cost or power consumption to secure a countermeasure for an error in transmission of header information. That is, since a CRC code is added to a packet format used for data transmission between the image sensor 11 and a DSP 12s, it is possible to detect in the DSP 12s whether there is an error in transmission of header information. Also, by transmission of three pairs of header information and a CRC code, it is possible to perform correction into correct header information in the DSP 12s when an error in transmission of header information is generated.

When an error correction code is used as a countermeasure for an error in transmission of header information, it is necessary to prepare a circuit to perform calculation of an error correction code in the transmission unit 22 and to prepare a circuit to perform error correction calculation in the reception unit 31. Since a CRC code which is an error detection code is added to the header information, it becomes possible to reduce a circuit scale and power consumption compared to a case where a circuit to perform calculation related to error correction is prepared. Also, a reception unit 31s does not request a transmission unit 22s to re-transmit header information when an error in the header information is detected. Thus, it is not necessary to prepare a transmission path in an opposite direction which path is for a request for the re-transmission.

By increasing redundancy and by configuring a control code by combining a plurality of K Characters of an 8B10B code, it is possible to decrease error probability of a control code. Thus, it becomes possible to secure a countermeasure for an error in transmission of a control code with a relatively simple circuit.

More specifically, 4s symbols of three kinds of K Characters are combined and used for a Starts Code. However, when at least a symbol other than K28.5 can be detected, it is possible to specify a Start Code in the reception unit 31s. It can be said that transmission error resistance is high. An Ends Code is in a similar manner.

Also, 4s kinds of K Characters are combined and used for a Pad Code. Since more kinds of Ks Characters are assigned compared to the other control codes, it becomes possible to increase an error resistance compared to the other control codes. That is, when one kind of symbol can be detected among four kinds of symbols, it is possible to specify a Pad Code in the reception unit 31s. Since the Pads Code is transmitted frequently compared to the Start Code or the Ends Code, a structure which makes it possible to increase an error resistance is included.

In addition, the same control code is transmitted in each Lane at the same timing. Thus, when a transmission error is generated in is Lane and a control code is lost, it is possible to reconstruct the control code, in which the error is generated, by using a control code of a different Lane.

Also, since the number of K Characters is limited, each control code is configured by combination of the minimum number of K Characters. For example, in each of a Syncs Code, a Deskews Code, and a Standbys Code in which a transmission error can be relatively allowed by repeatedly-performed transmission, a data structure to which it is not necessary to add a Ks Character is used.

Since a control code necessary for re-synchronization is assigned in each packet (each line), it is possible to perform re-synchronization promptly when the bit synchronization is lost due to a disturbance such as static electricity or due to a noise. Also, it is possible to minimize an influence of a transmission error due to a synchronization loss.

More specifically, transition/edge of bit data after the 8B10B conversion is detected in CDRs realized by a clock generation unit 112s and the synchronization unit 113, whereby bit synchronization can be performed. When the transmission unit 22 keeps transmitting data, bit synchronization can be performed in a period assumed as CDRs lock time.

Also, even when the symbol synchronization is lost, re-synchronization can be performed promptly by detection of a specific K Character (K28.5s) in the symbol synchronization unit 114. Since K28.5 is used in each of the Start Codes, the End Codes, and the Deskews Code, it becomes possible to perform symbol synchronization at three points during transmission of packet data of one packet.

Also, by making it possible to correct Datas Skew between Lanes by using the Deskews Code, it becomes also possible to perform synchronization between the Lanes.

In the link layer, each piece of packet data is processed in parallel in a group-unit such as 16s. Thus, it becomes possible to control a circuit scale or a memory amount compared to a case where one piece of packet data is processed in one clock cycle. In implementation, with respect to a case where one piece of packet data is processed at a time and a case where packet data is processed in each predetermined unit, a circuit scale or the like can be controlled more in the latter case. Since it is possible to control the circuit scale, power consumption can be also controlled.

Also, in assignment of a Lane, error resistance can be improved by assigning successive pieces of packet data to different Lanes. Even when an error is generated in successive pieces of packet data the number of which pieces is beyond error correction capacity of parity in a certain Lane, positions in the packet data at which positions errors are generated are spread since Lane integration is performed in the reception unit 31s. Thus, it becomes possible to perform error correction by using parity. The error correction capacity by parity is determined depending on a parity length.

Moreover, ECC processing is performed in an upper layer of Lane distribution/Lane integration with a side closer to the physical layer being a lower layer, whereby it becomes possible to decrease the circuit scale of each of the transmission unit 22s and the reception unit 31. For example, when parity of the ECC is inserted into a payload after assignment of packet data to each Lane is performed in the transmission unit 22s, it is necessary to prepare a payload ECCs insertion unit in each Lane and a circuit scale becomes large. However, such a situation can be prevented.

Processing of packet data is performed in parallel in a plurality of circuits in the physical layer. However, by commonization of the PHY-TX state control unit 81 or the clock generation unit 82, a circuit can be simplified compared to a case where these circuits are prepared in each Lane. Also, by using a protocol not to transmit a different control code to each Lane, it is possible to simplify a circuit to perform packet data of each Lane.

<Example of Converting 12s-Bit Original Image Data Format into Eight-Bit Compression Data Format and Performing Transmission/Reception>

In the above, the following example has been described. That is, pixel data of an original image in the 12s-bit original image data format is compressed into compression data in a six-bit compression data format at a 50% compression rate. Then, conversion into an 8s-bit transmission data format is performed and transmission/reception is performed. However, compression data of the number of bits other than what has been described above can be also transmitted/received.

For example, when conversion into an eight-bit transmission format and transmission/reception are performed after the 12-bit original image data format is compressed into compression data in the eight-bit compression data format, each of the number of bits in the compression data format of one pixel and the number of bits in the transmission data format becomes 8s bits. Thus, it becomes possible to perform transmission/reception by adopting the compression data into the transmission format as it is. That is, in this case, data which is indicated by the data Byte3*Ns+2 in the transmission data format in FIG. 11 and in which lower bits are collected becomes unnecessary. As a result, even when compression data in an 8s-bit compression data format is transmitted, high-speed transmission using 8B10B conversion corresponding to clock data recovery can be realized.

<Example of Converting 12-Bit Original Image Data Format into Five-bit Compression Data Format>

Moreover, for example, by compressing data in a 12s-bit original image data format of is pixel into a 5s-bit compression data format and arranging that of 2s pixels in a compression data format including a structure identical to that of an original image data format having 10s bits in one pixel, it becomes possible to perform conversion into an existing eight-bit transmission format and to perform transmission/reception.

Figure 13:
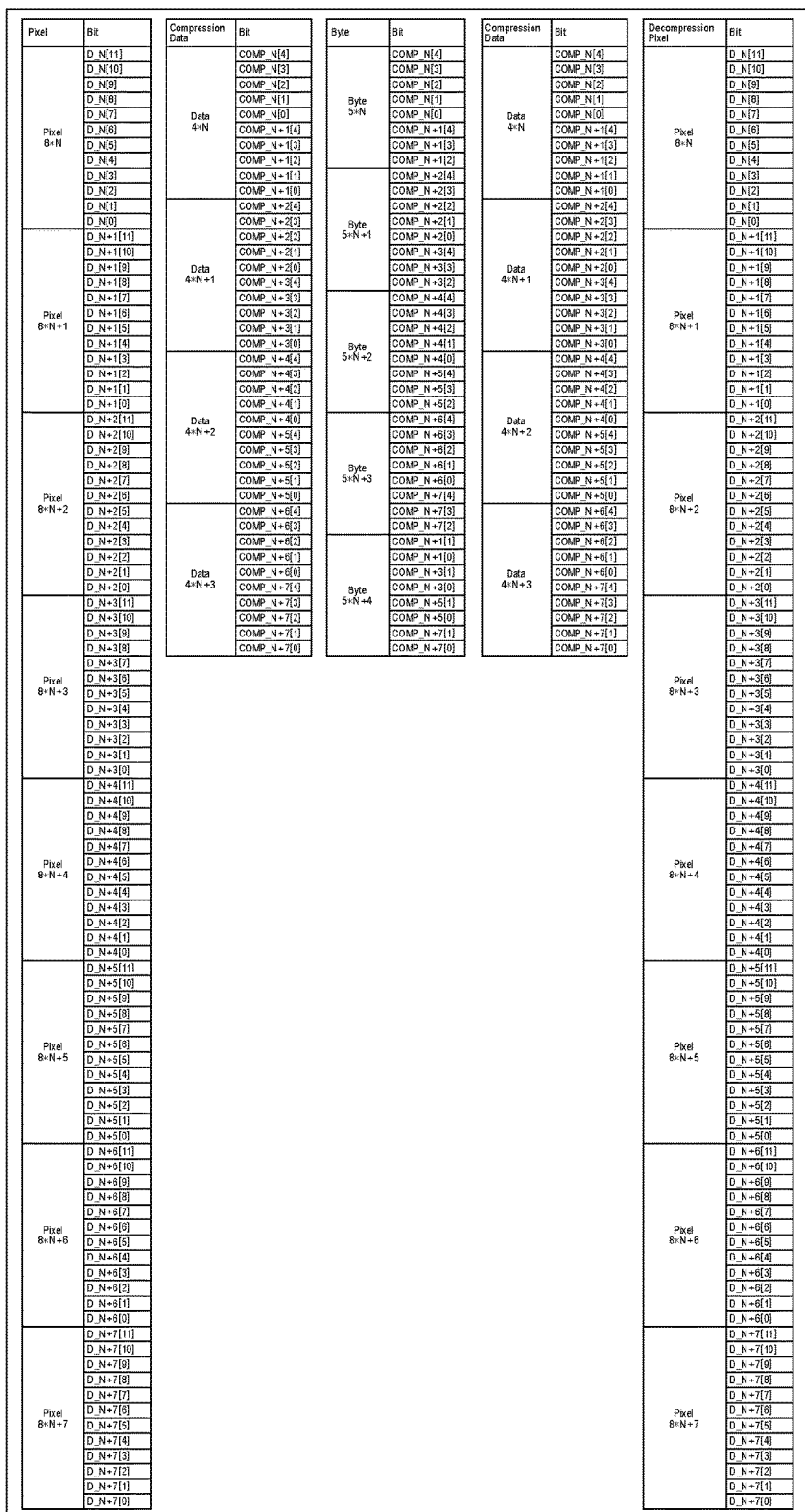
FIG. 13 is a view for describing an example of performing data transmission processing and data reception processing by converting a 12-bit original image data format into a five-bit compression data format.

More specifically, as illustrated in the leftmost column in FIG. 13, data Pixel8s*N to Pixel8s*N+7s in an 8s-pixel original image data format is compressed by the above-described processing in step S14s, whereby conversion into data Data4s*Ns to Data4s*Ns+3 in a compression data format including a structure identical to that of the 10-bit original image data format illustrated in the second column from the left in FIG. 13 is performed. That is, the compression unit 54s converts 12s-bit data Ds_N[0] to [11] to D_N+7[0] to [11] of the data Pixel8s*N to Pixel8s*N+7s in the original image data format into five-bit compressed data COMP_N[0] to [4] to COMP_N+7[0] to [4]. Moreover, as illustrated in the second column from the left in FIG. 13, the compression unit 54 arranges data COMP_N[0] to [4] and COMP_N+1[0] to [4] of two pixels in the data Data4*N in the compression data format, data COMP_N+2[0] to [4] and COMP_N+3[0] to [4] in the data Data4*N+1 in the compression data format, data COMP_N+4[0] to [4] and COMP_N+5[0] to [4] in the data Data4*N+2 in the compression data format, and data COMP_N+6[0] to [4] and COMP_N+7[0] to [4] in the data Data4*N+3 in the compression data format. By such processing, the 12-bit original image data format is compressed into five bits and is converted into a compression data format including a structure identical to that of the original image data format in a unit of 10 bits in two pixels.

Then, by the processing in step S15, the data Data4*N to Data4*N+3 in the compression data format illustrated in the second column from the left in FIG. 13 is converted into data Byte5*N to Byte5*N+4 in the eight-bit transmission data format. That is, as illustrated in the third column from the left in FIG. 13, the conversion unit 62 arranges upper eight bits, which include the data COMP_N[0] to [4] and the data COMP_N+1[2] to [4] of the data Data4*N, into the data Byte5*N in the transmission data format. Similarly, the conversion unit 62 arranges the data COMP_N+2[0] to [4] and the data COMP_N+3[2] to [4] of the data Data4*N+1 into the data Byte5*N+1, arranges the data COMP_N+4[0] to [4] and the data COMP_N+5[2] to [4] of the data Data4*N+2 into the data Byte5*N+2, arranges the data COMP_N+6[0] to [4] and the data COMP_N+7[2] to [4] of the data Data4*N+3 into the data Byte5*N+3, and arranges, into the data Byte5*N+4, the data COMP_N+1[0] to [1], COMP_N+3[0] to [1], COMP_N+5[0] to [1], and COMP_N+7[0] to [1] which respectively include lower two bits of the data Data4*N to Data4*N+3.

Moreover, by the processing in step S40, Byte5*N to Byte5*N+4 in the transmission data format illustrated in the third column from the left in FIG. 13 is converted into the data Data4*N to Data4*N+3 in a compression data format which includes a structure identical to the 10-bit original image data format and which is illustrated in the second column from the right in FIG. 13. That is, the conversion unit 125 arranges, into the data Data4*N in the 10-bit compression data format, the data COMP_N[0] to [4] and the data COMP_N+1[2] to [4] of the data Byte5*N in the transmission data format and the data COMP_N+1[0] to [1] of the data Byte5*N+4 as pieces of data compressed into five bits of two pixels. Similarly, the conversion unit 125 arranges the data COMP_N+2[0] to [4] and the data COMP_N+3[2] to [4] of the data Byte5*N+1 and the data COMP_N+3[0] to [1] of the data Byte5*N+4 into the data Data4*N+1, arranges the data COMP_N+4[0] to [4] and the data COMP_N+5[2] to [4] of the data Byte5*N+2 and the data COMP_N+5[0] to [1] of the data Byte5*N+4 into the data Data4*N+2, and arranges the data COMP_N+6[0] to [4] and the data COMP_N+7[2] to [4] of the data Byte5*N+3 and the data COMP_N+7[0] to [1] of the data Byte5*N+4 into the data Data4*N+3.

Then, by the processing in step S41, the data Data4*N to Data4*N+3 in a compression data format which includes a structure identical to that of the 10-bit original image data format illustrated in the second column from the left in FIG. 13 and in which compressed data in a two-pixel unit is arranged is expanded into data Pixel8*N to Pixel8*N+7 in an original image data format illustrated in the rightmost column in FIG. 13.

That is, the expansion unit 144 respectively expands the five-bit data COMP_N[0] to [4] and COMP_N+1[0] to [4] of two pixels of the data Data4*N in a 10-bit compression data format including a structure identical to that of the 10-bit original image data format into D_N[0] to [11] and D_N+1[0] to [11] and arranges the expanded data in the data Pixel8*N and the Pixel8*N+1 in the 12-bit original image data format. Similarly, the expansion unit 144 respectively expands the data COMP_N+2[0] to [4] and COMP_N+3[0] to [4] of the data Data4*N+1 into D_N+2[0] to [11] and D_N+3[0] to [11] and arranges the pieces of expanded data in the data Pixel8*N+2 and Pixel8*N+3. Also, the expansion unit 144 respectively expands the data COMP_N+4[0] to [4] and COMP_N+5[0] to [4] of the data Data4*N+2 into D_N+4[0] to [11] and D_N+5[0] to [11] and arranges the expanded data in the data Pixel8*N+4 and Pixel8*N+5. Also, the expansion unit 144 respectively expands the data COMP_N+6[0] to [4] and COMP_N+7[0] to [4] of the data Data4*N+3 into D_N+6[0] to [11] and D_N+7[0] to [11] and arranges the expanded data in the data Pixel8*N+6 and Pixel8*N+7.

By the above processing, transmission/reception in the eight-bit transmission data format in a case where the 12-bit original image data format is compressed into a five-bit compression data format is realized.

<First Example of Converting 12-bit Original Image Data Format into Four-bit Compression Data Format and Performing Transmission/Reception>

Moreover, for example, after data in the original image data format having 12 bits in one pixel is compressed into a four-bit compression data format, arrangement into a compression data format including a structure identical to that of an original image data format having eight bits in one pixel is performed by two pixels, whereby it becomes possible to perform conversion into an existing eight-bit transmission format and to perform transmission/reception.

More specifically, as illustrated in the leftmost column in FIG. 14, the data Pixel2*N and Pixel2*N+1 in the original image data format of two pixels is compressed by the above-described processing in step S14. Thus, conversion into data DataN in a compression data format including a structure identical to that of the eight-bit original image data format illustrated in the second column from the left in FIG. 14 is performed. That is, the compression unit 54 converts the 12-bit data D_N[0] to [11] to data D_N+7[0] to [11] of the data Pixel2*N and Pixel2*N+1 in the original image data format into the four-bit compression data COMP_N[0] to [3] to COMP_N+1[0] to [3]. Moreover, as illustrated in the second column from the left in FIG. 14, the compression unit 54 arranges the eight-bit data COMP_N[0] to [3] and COMP_N+1[0] to [3] of two pixels into the data DataN in the compression data format. By such processing, the 12-bit original image data format is compressed into four-bit pieces of data. Then, arrangement by two pixels into the compression data format in an eight-bit unit which format includes a structure identical to that of the eight-bit original image data format is performed.

Then, by the processing in step S15, the data DataN in the compression data format illustrated in the second column from the left in FIG. 14 is converted into data ByteN in an eight-bit transmission data format. That is, as illustrated in the third column from the left in FIG. 14, the conversion unit 62 arranges eight bits including the data COMP_N[0] to [3] and the data COMP_N+1[0] to [3] of the data DataN into the data ByteN in the eight-bit transmission data format.

Moreover, by the processing in step S40, ByteN in the transmission data format illustrated in the third column from the left in FIG. 14 is converted into the data DataN in the compression data format including a structure identical to that of the eight-bit original image data format illustrated in the second column from the right in FIG. 14. That is, the conversion unit 125 arranges, into the data DataN in the compression data format, the data COMP_N[0] to [3] and COMP_N+1[0] to [3] of the data ByteN in the transmission data format.

Then, by the processing in step S41, the data DataN in the compression data format including a structure identical to the eight-bit original image data format illustrated in the second column from the left in FIG. 14 is expanded into the data Pixel2*N to Pixel2*N+1 in the original image data format illustrated in the rightmost column in FIG. 14.

That is, the expansion unit 144 respectively expands the four-bit data COMP_N[0] to [3] and COMP_N+1[0] to [3] included in the data DataN in the eight-bit compression data format of two pixels, which format includes a structure identical to that of the eight-bit original image data format, into the data D_N[0] to [11] and D_N+1[0] to [11] and respectively arranges the expanded pieces of data into the data Pixel2*N and Pixel2*N+1 in the 12-bit original image data format.

By the above processing, transmission/reception in the eight-bit transmission data format in a case where the 12-bit original image data format is compressed into the four-bit compression data format is realized.

<Second Example of Converting 12-bit Original Image Data Format into Four-bit Compression Data Format and Performing Transmission/Reception>

With respect to a case of converting the 12-bit original image data format into a four-bit compression data format, there is a different method. That is, for example, after data in the original image data format having 12 bits in one pixel is compressed into the four-bit compression data format, arrangement into a compression data format including a structure identical to that of the original image data format having 12 bits in one pixel is performed by three pixels, whereby it becomes possible to perform conversion into the existing eight-bit transmission format and to perform transmission/reception.

More specifically, as illustrated in the leftmost column in FIG. 15, data Pixel6*N to Pixel6*N+5 in a six-pixel original image data format is compressed by the above-described processing in step S14. Thus, conversion into the data Data2*N and Data2*N+1 in a compression data format including a structure identical to that of the 12-bit original image data format illustrated in the second column from the left in FIG. 15 is performed. That is, the compression unit 54 converts the 12-bit data D_N[0] to [11] to D_N+5[0] to [11] of the data Pixel6*N to Pixel6*N+5 in the original image data format into the four-bit compression data COMP_N[0] to [3] to COMP_N+5[0] to [3]. In addition, as illustrated in the second column from the left in FIG. 15, the compression unit 54 arranges the data COMP_N[0] to [3] to COMP_N+2[0] to [3] of three pixels into the data Data2*N in the compression data format and arranges the data COMP_N+3[0] to [3] to COMP_N+5[0] to [3] into the data Data2*N+1 in the compression data format. By such processing, the 12-bit original image data format is converted into the four-bit compression data and into a compression data format in a 12-bit unit.

Then, by the processing in step S15, the data Data2*N to Data2*N+1 in the compression data format corresponding to the 12-bit original image data format illustrated in the second column from the left in FIG. 15 is converted into the data Byte3*N to Byte3*N+2 in the eight-bit transmission data format. That is, as illustrated in the third column from the left in FIG. 15, the conversion unit 62 arranges upper eight bits including the data COMP_N[0] to [3] and the data COMP_N+1[0] to [3] of the data Data2*N into the data Byte3*N in the transmission data format. Similarly, the conversion unit 62 arranges the data COMP_N+3[0] to [3] and the data COMP_N+4[0] to [3] of the data Data2*N+1 into the data Byte3*N+1 and arranges the data COMP_N+2[0] to [3] and COMP_N+5[0] to [3] respectively including lower four bits of the data Data2*N and lower four bits of the data Data2*N+1 into the data Byte3*N+2.

Moreover, by the processing in step S40, Byte3*N to Byte3*N+2 in the transmission data format illustrated in the third column from the left in FIG. 15 are converted into the data Data2*N and Data2*N+1 in the compression data format which includes a structure identical to that of the 12-bit original image data format and which is illustrated in the second column from the right in FIG. 15. That is, the conversion unit 125 arranges, into the data Data2*N in the compression data format, the data COMP_N[0] to [3] and the data COMP_N+1[0] to [3] of the data Byte3*N in the transmission data format and the data COMP_N+2[0] to [3] of the data Byte3*N+2. Similarly, the conversion unit 125 arranges, into the data Data2*N+1, the data COMP_N+3[0] to [3] and the data COMP_N+4[0] to [3] of the data Byte3*N+1 and the data COMP_N+5[0] to [3] of the data Byte3*N+2.

Then, by the processing in the step S41, the data Data2*N and Data2*N+1 in the compression data format including a structure identical to that of the 12-bit original image data format illustrated in the second column from the right in FIG. 15 is expanded into the data Pixel6*N to Pixel6*N+5 in the original image data format illustrated in the rightmost column in FIG. 15.

That is, the expansion unit 144 respectively expands the four-bit data COMP_N[0] to [3] to COMP_N+2[0] to [3] of the data Data2*N in the four-bit compression data format of three pixels which format includes a structure identical to that of the 12-bit original image data format into D_N[0] to [11] to D_N+2[0] to [11] and arranges the expanded data into the data Pixel6*N to Pixel6*N+2 in the 12-bit original image data format. Similarly, the expansion unit 144 respectively expands the data COMP_N+3[0] to [3] to COMP_N+5[0] to [3] of the data Data2*N+1 into the data D_N+3[0] to [11] to D_N+5[0] to [11] and arranges the expanded data into the data Pixel6*N+3 to Pixel6*N+5.

By the above processing, transmission/reception in the eight-bit transmission data format in a case where the 12-bit original image data format is compressed into the four-bit compression data format is realized.

<Example of Converting 10-bit Original Image Data Format into Six-bit Compression Data Format and Performing Transmission/Reception>

In the above, a case where the original image data format is 12 bits has been described. However, for example, a 10-bit original image data format may be converted into a six-bit compression data format. That is, for example, after data in an original image data format having 10 bits in one pixel is compressed into six-bit data, arrangement into a compression data format including a structure identical to that of an original image data format having 12 bits in one pixel is performed by two pixels, whereby it becomes possible to perform conversion into an existing eight-bit transmission format and to perform transmission/reception.

Figure 16:
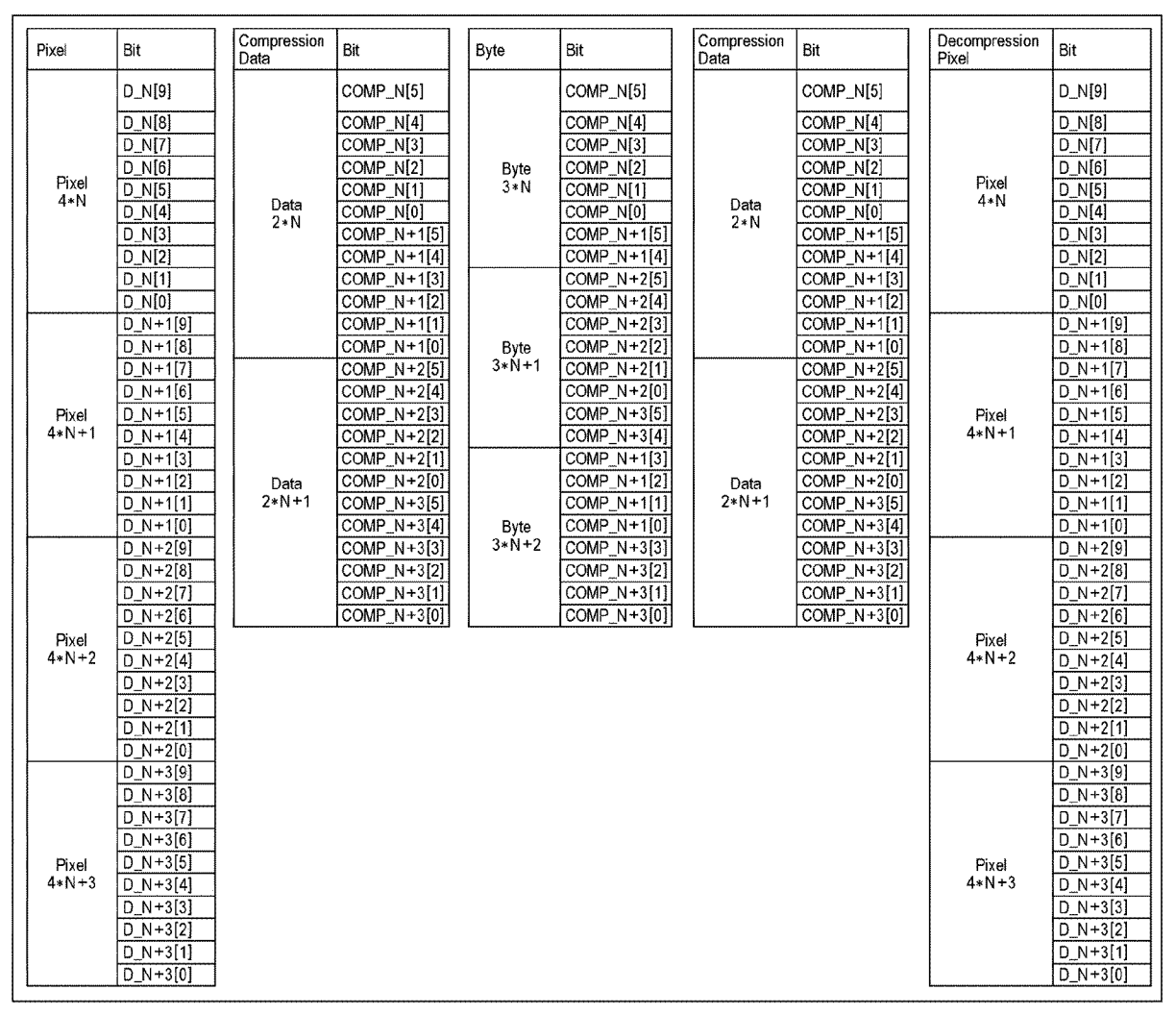

More specifically, as illustrated in the leftmost column in FIG. 16, data Pixel4*N to Pixel4*N+3 in an original image data format having 10 bits of four pixels is compressed by the above-described processing in step S14. Thus, conversion into the data Data2*N and Data2*N+1 in a compression data format including a structure identical to that of a 12-bit original image data format illustrated in the second column from the left in FIG. 16 is performed. That is, the compression unit 54 converts 10-bit data D_N[0] to [9] to D_N+3[0] to [9] of the data Pixel4*N to Pixel4*N+3 in the original image data format into six-bit compression data COMP_N [0] to [5] to data COMP_N+3[0] to [5]. In addition, as illustrated in the second column from the left in FIG. 16, the compression unit 54 arranges the data COMP_N[0] to [5] and COMP_N+1[0] to [5] of two pixels into the data Data 2*N in the compression data format and arranges the data COMP_N+2[0] to [5] and COMP_N+3[0] to [5] into the data Data2*N+1 in the compression data format. By such processing, the 10-bit original image data format is compressed into six-bit data and arranged by two pixels in the compression data format in a 12-bit unit.

Then, by the processing in step S15, the data Data2*N to Data2*N+1 in the compression data format illustrated in the second column from the left in FIG. 16 is converted into the data Byte3*N to Byte3*N+2 in the eight-bit transmission data format. That is, as illustrated in the third column from the left in FIG. 16, the conversion unit 62 arranges upper eight bits including the data COMP_N[0] to [5] and COMP_N+1[4] to [5] of the data Data2*N into the data Byte3*N in the transmission data format. Similarly, the conversion unit 62 arranges upper eight bits including the data COMP_N+2[0] to [5] and the data COMP_N+4[4] to [5] of the data Data2*N+1 into the data Byte3*N+1 and arranges the data COMP_N+1[0] to [3] and COMP_N+3[0] to [3] including lower four bits of each of the data Data2*N and Data2*N+1 into the data Byte3*N+2.

Moreover, by the processing in step S40, Byte3*N to Byte3*N+2 in the transmission data format illustrated in the third column from the left in FIG. 16 are converted into the data Data2*N and Data2*N+1 in the compression data format which includes a structure identical to that of the 12-bit original image data format and which is illustrated in the second column from the right in FIG. 16. That is, the conversion unit 125 arranges the data COMP_N[0] to [5] and the data COMP_N+1[4] to [5] of the data Byte 3 *N in the transmission data format and COMP_N+2[0] to [3] of the data Byte3*N+2 into the data Data2*N in the compression data format. Similarly, the conversion unit 125 arranges the data COMP_N+2[0] to [5] and the data COMP_N+3[4] to [5] of the data Byte3*N+2 and the data COMP_N+5[0] to [3] of the data Byte3*N+2 into the data Data2*N+1.

Then, by the processing in the step S41, the data Data2*N and Data2*N+1 in the compression data format including a structure identical to that of the 12-bit original image data format illustrated in the second column from the right in FIG. 16 is expanded into the data Pixel4*N to Pixel4*N+3 in the 10-bit original image data format illustrated in the rightmost column in FIG. 16.

That is, the expansion unit 144 respectively expands the six-bit data COMP_N[0] to [5] to COMP_N+1[0] to [5] of the data Data2*N in the six-bit compression data format of two pixels which format includes a structure identical to that of the 12-bit original image data format into D_N[0] to [9] and D_N+1[0] to [9] and arranges the expanded data into the data Pixel4*N and Pixel4*N+1 in the 10-bit original image data format. Similarly, the expansion unit 144 respectively expands the data COMP_N+2[0] to [5] and COMP_N+3[0] to [5] of the data Data2*N+1 into the data D_N+2[0] to [9] to D_N+3[0] to [9] and arranges the expanded data into the data Pixel4*N+2 to Pixel4*N+3.

By the above processing, transmission/reception in the eight-bit transmission data format in a case where the 10-bit original image data format is compressed into the six-bit compression data format is realized.

<Example of Converting 10-bit Original Image Data Format into Five-bit Compression Data Format>

In the above, an example of converting a 10-bit original image data format into a six-bit compression data format has been described. However, for example, after data in an original image data format having 10 bits in one pixel is compressed into a five-bit compression data format, arrangement into a compression data format including a structure identical to that of the original image data format having 10 bits in one pixel is performed by two pixels, whereby it becomes possible to perform conversion into the existing eight-bit transmission data format and to perform transmission/reception.

More specifically, as illustrated in the leftmost column in FIG. 17, the data Pixel8*N to Pixel8*N+7 in an original image data format of eight pixels is compressed by the above-described processing in step S14. Thus, conversion into the data Data4*N and Data4*N+3 in a compression data format including a structure identical to that of the 10-bit original image data format illustrated in the second column from the left in FIG. 17 is performed. That is, the compression unit 54 compresses the 10-bit data D_N[0] to [9] to D_N+7[0] to [9] of the data Pixel8*N to Pixel8*N+7 in the original image data format into five bits and performs conversion into the data COMP_N[0] to [4] to COMP_N+7[0] to [4]. Moreover, as illustrated in the second column from the left in FIG. 17, the compression unit 54 arranges the data COMP_N[0] to [4] and COMP_N+1[0] to [4] of two pixels into the data Data4*N in the compression data format, the data COMP_N+2[0] to [4] and COMP_N+3[0] to [4] into the data Data4*N+1 in the compression data format, the data COMP_N+4[0] to [4] and COMP_N+5[0] to [4] into the data Data4*N+2 in the compression data format, and the data COMP_N+6[0] to [4] and COMP_N+7[0] to [4] into the data Data4*N+3 in the compression data format. By such processing, the 10-bit original image data format is compressed into five bits and arranged into the compression data format in a 10-bit unit by two pixels.

Then, by the processing in step S15, the data Data4*N to Data4*N+3 in the compression data format illustrated in the second column from the left in FIG. 17 is converted into the data Byte5*N to Byte5*N+4 in the eight-bit transmission data format. That is, as illustrated in the third column from the left in FIG. 17, the conversion unit 62 arranges upper eight bits, which include the data COMP_N[0] to [4] and the data COMP_N+1[2] to [4] of the data Data4*N, into the data Byte5*N in the transmission data format. Similarly, the conversion unit 62 arranges the data COMP_N+2[0] to [4] and COMP_N+3[2] to [4] of the data Data4*N+1 into the data Byte5*N+1, arranges the data COMP_N+4[0] to [4] and COMP_N+5[2] to [4] of the data Data4*N+2 into the data Byte5*N+2, arranges the data COMP_N+6[0] to [4] and COMP_N+7[2] to [4] of the data Data4*N+3 into the data Byte5*N+3, and arranges, into the data Byte5*N+4, the data COMP_N+1[0] to [1], COMP_N+3[0] to [1], COMP_N+5[0] to [1], and COMP_N+7[0] to [1] which respectively include lower two bits of the data Data4*N to Data4*N+3.

Moreover, by the processing in step S40, the data Byte5*N to Byte5*N+4 in a transmission data format illustrated in the third column from the left in FIG. 17 is converted into the data Data4*N to Data4*N+3 in a compression data format which includes a structure identical to that of the 10-bit original image data format and which is illustrated in the second column from the right in FIG. 17. That is, the conversion unit 125 arranges the data COMP_N[0] to [4] and the data COMP_N+1[2] to [4] of the data Byte5*N in the transmission data format and the data COMP_N+1[0] to [1] of the data Byte5*N+4 into the data Data4*N in a compression data format. Similarly, the conversion unit 125 arranges the data COMP_N+2[0] to [4] and the data COMP_N+3[2] to [4] of the data Byte5*N+1 and the data COMP_N+3[0] to [1] of the data Byte5*N+4 into the data Data4*N+1, arranges the data COMP_N+4[0] to [4] and the data COMP_N+5[2] to [4] of the data Byte5*N+2 and the data COMP_N+5[0] to [1] of the data Byte5*N+4 into the data Data4*N+2, and arranges the data COMP_N+6[0] to [4] and the data COMP_N+7[2] to [4] of the data Byte5*N+3 and the data COMP_N+7[0] to [1] of the data Byte5*N+4 into the data Data4*N+3.

Then, by the processing in step S41, the data Data4*N to Data4*N+3 in a compression data format including a structure identical to that of the 10-bit original image data format illustrated in the second column from the left in FIG. 17 is expanded into the data Pixel8*N to Pixel8*N+7 in an original image data format illustrated in the rightmost column in FIG. 17.

That is, the expansion unit 144 respectively expands, into data D_N[0] to [9] and D_N+1[0] to [9], the five-bit data COMP_N[0] to [4] and COMP_N+1[0] to [4] of the data Data4*N in the 10-bit compression data format of two pixels which format includes a structure identical to that of the 10-bit original image data format and arranges the expanded data into the data Pixel8*N and Pixel8*N+1 in the 10-bit original image data format. Similarly, the expansion unit 144 respectively expands the data COMP_N+2[0] to [4] and COMP_N+3[0] to [4] of the data Data4*N+1 into the data D_N+2[0] to [9] and D_N+3[0] to [9] and arranges the expanded data into the data Pixel8*N+2 and Pixel8*N+3. Also, the expansion unit 144 respectively expands the data COMP_N+4[0] to [4] and COMP_N+5[0] to [4] of the data Data4*N+2 into the data D_N+4[0] to [9] and D_N+5[0] to [9] and arranges the expanded data into the data Pixel8*N+4 and Pixel8*N+5. Also, the expansion unit 144 respectively expands the data COMP_N+6[0] to [4] and COMP_N+7[0] to [4] of the data Data4*N+3 into the data D_N+6[0] to [9] and D_N+7[0] to [9] and arranges the expanded data into the data Pixel8*N+6 and Pixel8*N+7.

The 10-bit original image data format is compressed into five bits by the above-described processing, whereby transmission/reception in the eight-bit transmission data format in a case where arrangement into a compression data format including a structure identical to that of the original image data format is performed by two pixels and compression is performed is realized.

<Example of Converting a Plurality of Pixels in 12-bit Original Image Data Format into Compression Data Format Corresponding to Original Image Data Format of a Different Plurality of Different Pixels and Performing Transmission/Reception>

In the above, an example of assigning a compression data format the number of bits thereof being fixed in a pixel unit to a predetermined original image data format with respect to each pixel and performing conversion into an eight-bit transmission data format has been described. However, it is possible to convert an original image data format corresponding to a plurality of pixels into a variable-length compression data format corresponding to a different plurality of pixels, to perform assignment to a predetermined original image data format, and to perform conversion into an eight-bit transmission format.

That is, for example, by converting a 12-bit original image data format of 32 pixels into a compression data format of the number of variable-length bits of 16 pixels and by arranging this in a compression data format corresponding to a predetermined 12-bit original image data format of 16 pixels, it becomes possible to perform conversion into an existing eight-bit transmission format and to perform transmission/reception.

Figure 18:
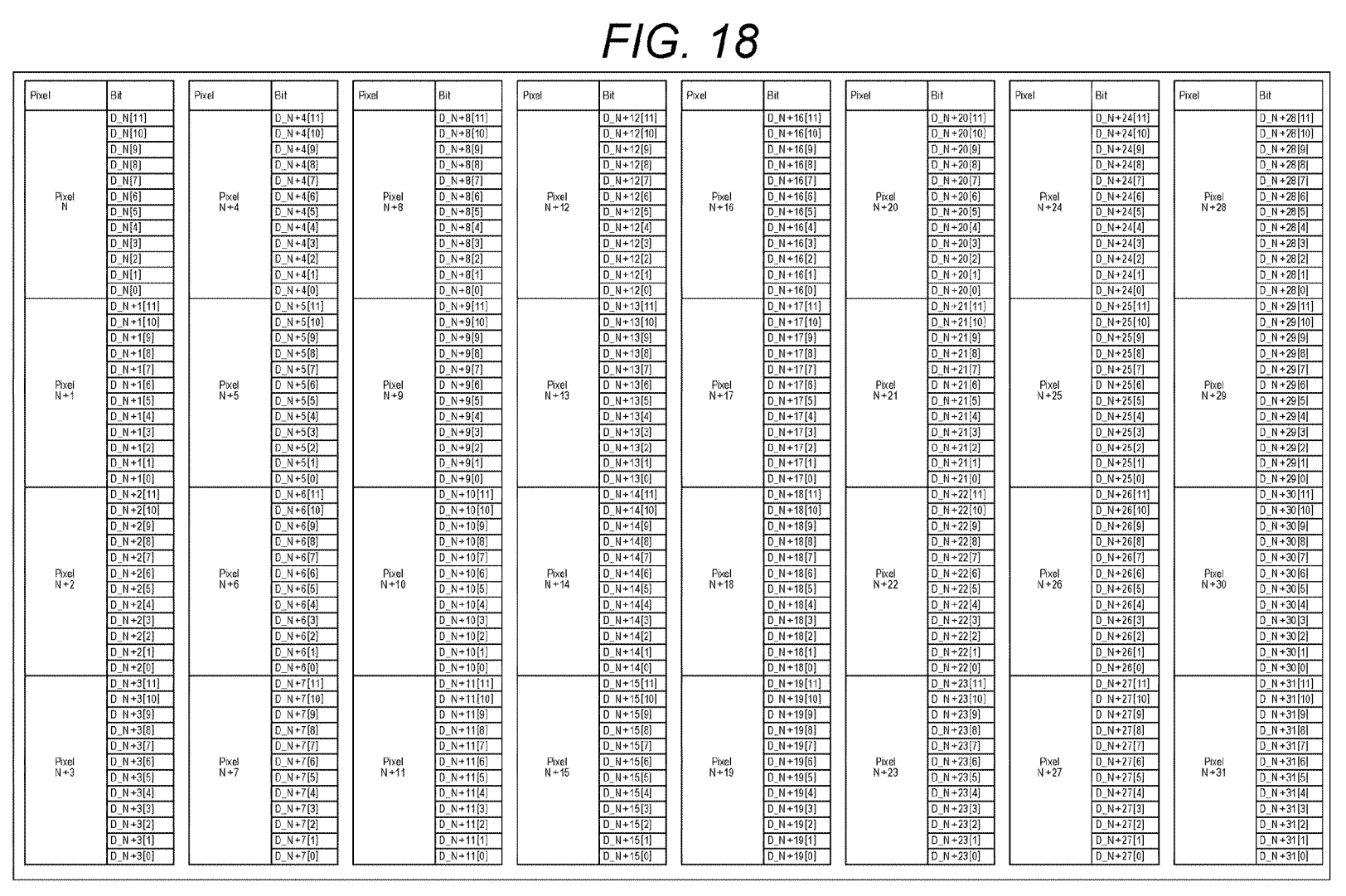
Figure 19:
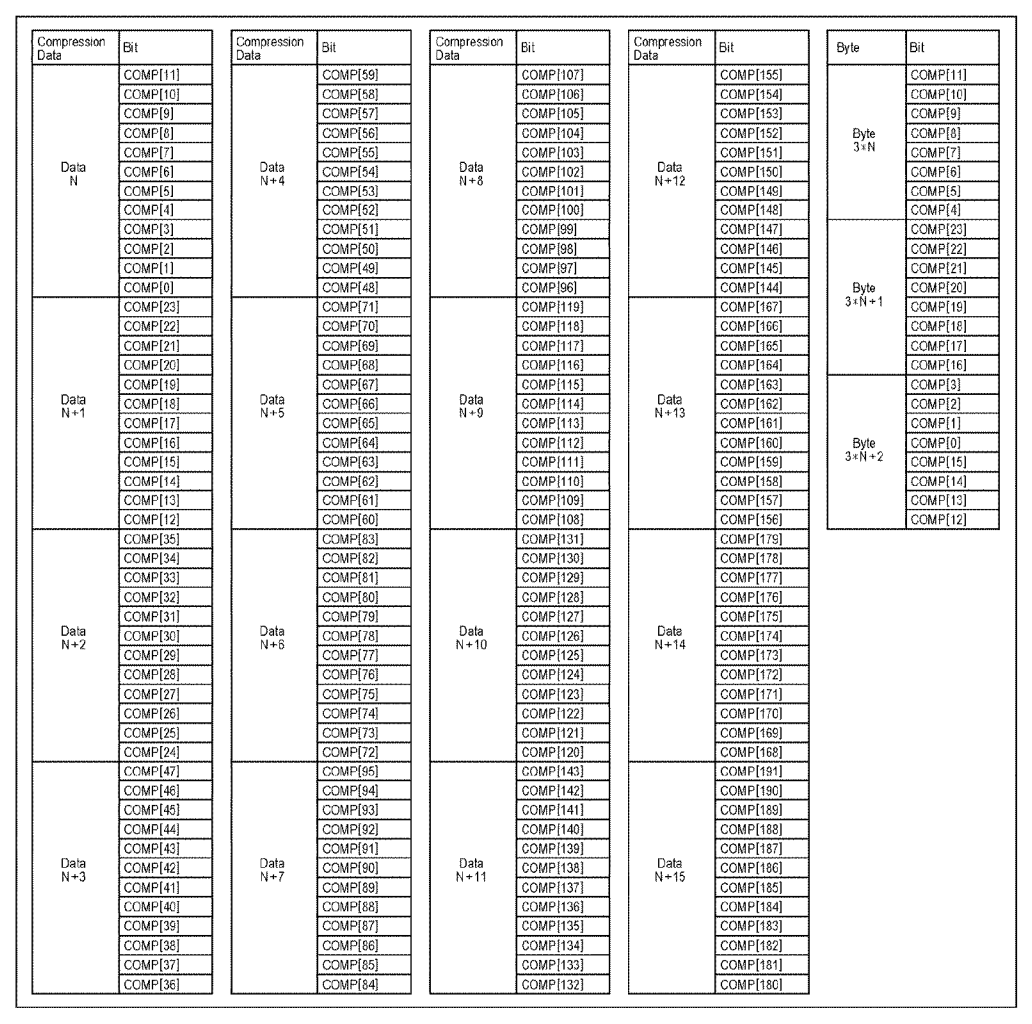

More specifically, as illustrated in FIG. 18, data Pixel N to pixel N+31 in the 12-bit original image data format of 32 pixels is compressed by the above-described processing in step S14. Thus, after conversion into compression data of a variable-length bit is performed with respect to each pixel, conversion into data DataN to DataN+15 in a compression data format including a structure identical to that of a 12-bit original image data format illustrated in all columns from the left to the fourth column in FIG. 19 is performed. That is, the compression unit 54 converts 12-bit data D_N[0] to [11] to D_N+31[0] to [11] of the data PixelN to PixelN+31 in the original image data format of 32 pixels into data COMP[0] to [191] corresponding to the 12-bit original image data format of 16 pixels in total in which format a length is variable with respect to each pixel. Moreover, as illustrated in all columns from the left to the fourth column in FIG. 19, the compression unit 54 arranges, by each 12 bits from the head, data COMP_N[0] to [11] corresponding to one pixel of the original image data format into the data DataN, arranges data COMP[12] to [23] into the data DataN+1, . . . and arranges data COMP[180] to [191] into the data DataN+15. By such processing, the 12-bit original image data format of 32 pixels is converted into a compression data format including a structure identical to that of the 12-bit original image data format of 16 pixels.

Then, by the processing in step S15, the data DataN to DataN+15 in the compression data format corresponding to the 12-bit original image data format illustrated in the columns from the left to the fourth column in FIG. 19 is converted by 24 bits into the data Byte3*N to Byte3*N+2 in the eight-bit transmission data format. That is, as illustrated in the rightmost column in FIG. 19, the conversion unit 62 arranges upper eight bits including data COMP[4] to [11] of the data DataN into the data Byte 3 *N in a transmission data format. Similarly, the conversion unit 62 arranges data COMP[16] to [23] of the data DataN+1 into the data Byte3*N+1 and arranges data COMP[0] to [3] and COMP [12] to [15] which respectively include lower four bits of the data DataN and lower four bits of DataN+1 into the data Byte3*N+2. Also, by similar processing, data DataN+2 to DataN+15 of 14 pixels in a compression data format including a configuration identical to that of the 12-bit original image data format is converted into an eight-bit transmission data format.

Moreover, by the processing in step S40, Byte3*N to Byte3*N+2 in the transmission data format illustrated in the rightmost column in FIG. 19 are serially converted into the data DataN to DataN+15 in the compression data format including the structure identical to that of the 12-bit original image data format which compression data format is illustrated in columns from the left to the fourth column in FIG. 19. That is, the conversion unit 125 arranges the data COMP[4] to [11] and the data COMP[0] to [3] of the data Byte3*N in the transmission data format into the data DataN in the compression data format. Similarly, the conversion unit 125 arranges the data COMP[16] to [23] and the data COMP[12] to [15] of the data Byte3*N+1 into the data DataN+1. By similar processing, an eight-bit transmission data format is converted into a compression data format including a configuration identical to that of the 12-bit original image data format of 16 pixels.

Figure 20:
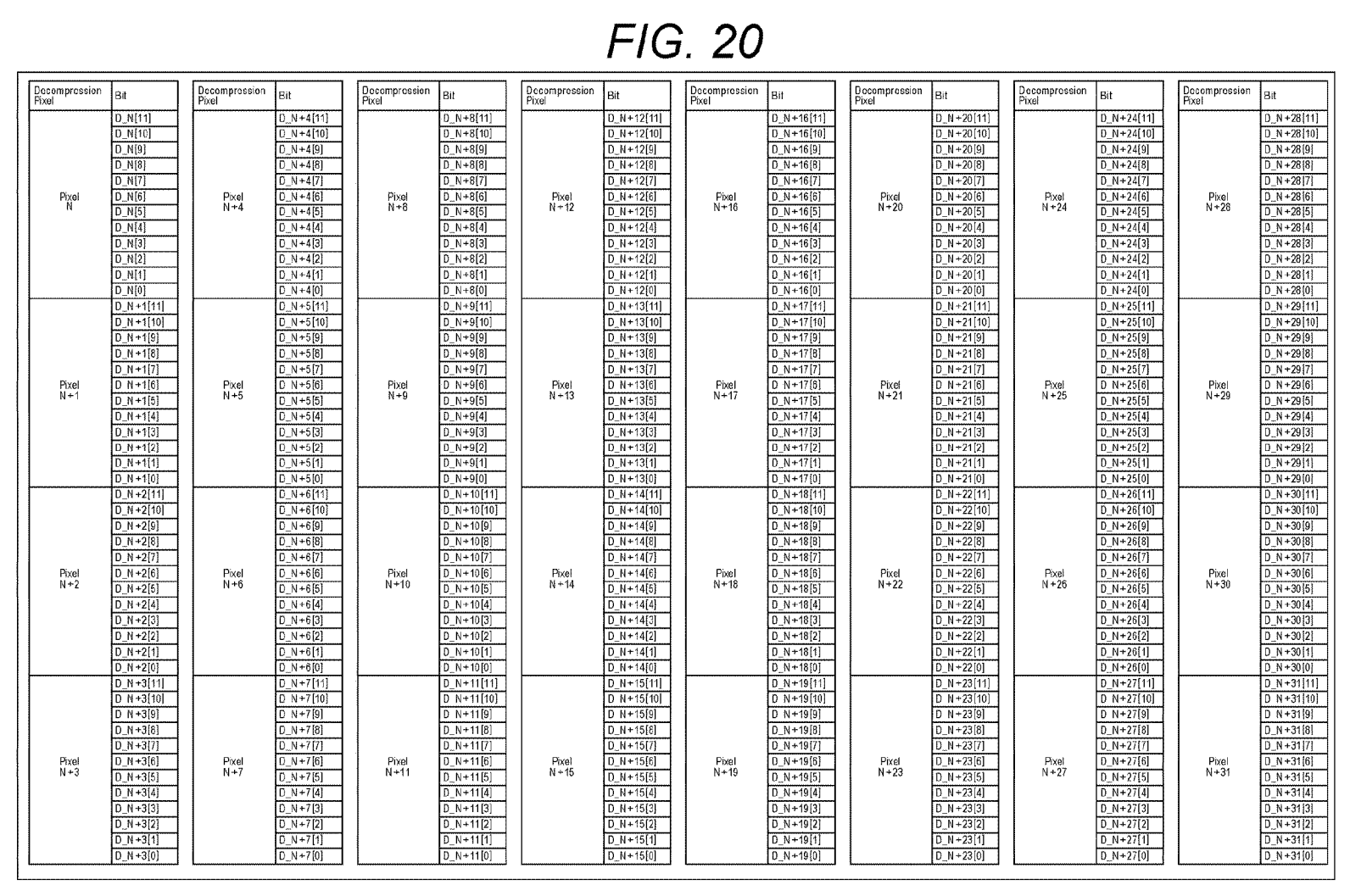

Then, by the processing in step S41, the data DataN to DataN+15 in the compression data format including the structure identical to that of the 12-bit original image data format of 16 pixels illustrated in columns from the left to the fourth column in FIG. 19 is expanded into the data Pixel N to PixelN+32 in an original image data format illustrated in FIG. 20.

That is, the expansion unit 144 respectively expands the data DataN to DataN+15 in the 12-bit compression data format of 16 pixels which format includes the structure identical to that of the 12-bit original image data format and the 12-bit data COMP[0] to [191] of 32 pixels into the data D_N[0] to [11] to D_N+31[0] to [11] and arranges the expanded data into the data PixelN to PixelN+31 in the 12-bit original image data format.

By the above-described processing, transmission/reception in an eight-bit transmission data format in a case where a 12-bit original image data format of 32 pixels (a plurality of pixels) is compressed into a compression data format of a variable-length bit of 16 pixels (a different plurality of pixels) is realized. That is, in a compression pixel data format, in a 12-bit unit, setting in a pixel unit is not performed. However, by setting a unit of a plurality of pixels, it becomes possible to perform transmission/reception of image data between the image sensor 11 and the DSP 12. Also, by a similar method, a 10-bit original image data format of 32 pixels is converted into a compression data format of the number of variable-length bits of 16 pixels and arrangement into a compression data format corresponding to an existing 10-bit original image data format of 16 pixels is performed, whereby it is possible to perform conversion into the existing eight-bit transmission format and to perform transmission/reception.

Note that in a case where processing is performed in a unit of a plurality of pixels, for example, it is considered that a multiple number of a unit of a plurality of pixels does not match the number of pixels in a horizontal direction. In such a case, adjustment may be performed by copying a pixel which is a fractional number near a final end in the horizontal direction and adding virtual data for matching with a multiple number of 32 or by copying virtual data of an average value and adding the virtual data for matching with a multiple number of 32. In such a manner, data with high correlation is virtually arranged and it becomes possible to decrease deterioration in image quality.

By the above-described processing, even in a compression data format of the number of bits generated by various compression rates, by using an existing interface, application as the existing number of bits which is any of eight bits, 10 bits, 12 bits, 14 bits, and 16 bits becomes possible. As a result, it becomes possible to use an existing interface without newly setting a data format, which is not put into practical use yet, such as RAW 4 or RAW 5.

Also, in an interface between the image sensor 11 and the DSP 12, it becomes possible to compress image data and to reduce a band. Thus, it becomes possible to transmit more images. Also, since it becomes possible to transmit more images without changing the number of Lanes in an interface, an advantage in implementation is improved. For example, since it becomes possible to reduce an amount of transmitted data, it becomes possible to store more images without changing a capacity of a frame memory and to perform application to noise-reduction or high dynamic range (HDR) imaging. Also, since it becomes possible to transmit an image at high speed in a transmission data format in an existing interface, it becomes possible to improve flexibility in compression or connectivity between an image sensor and a DSP.

<Setting Processing of Number of Bits and Compression Rate>

Figure 21:
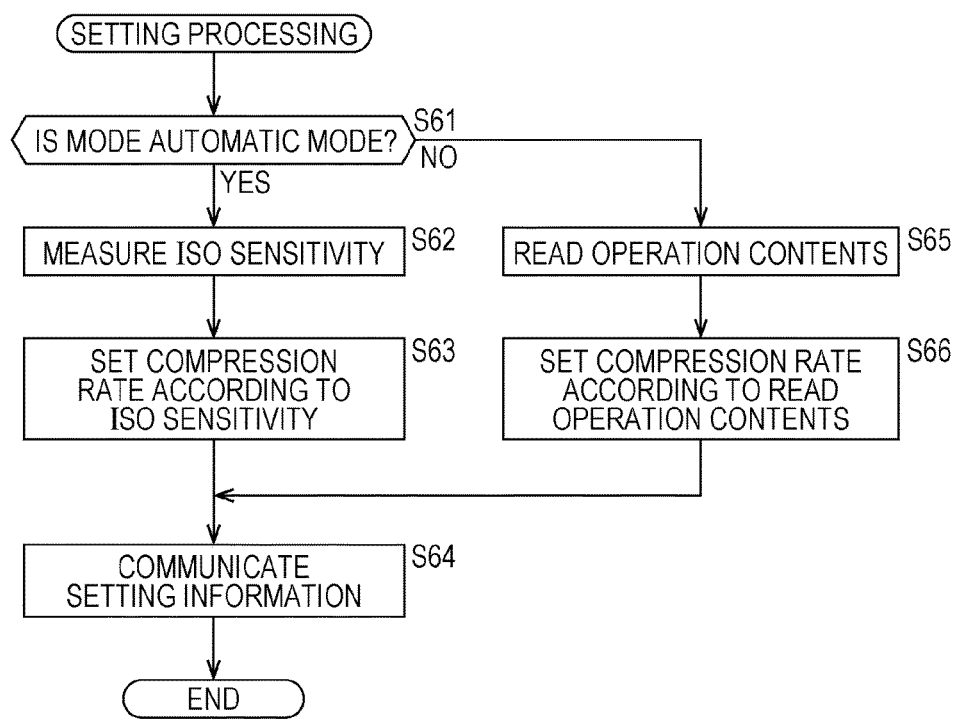
FIG. 21 is a view for describing setting processing to set the number of bits of an original image data format and a compression rate thereof.

Next, with reference to a flowchart in FIG. 21, setting processing of a compression rate will be described. In the setting processing of a compression rate, there are a manual mode set based on an operation signal generated by operation of an operation unit (not illustrated) by a user and an automatic mode set according to ISO sensitivity. With respect to the manual mode and the automatic mode, a switch or the like (not illustrated) to perform switching is provided and is previously operated by a user.

In step S61, based on an operation signal of the operation unit (not illustrated), the system control unit 143 of the DSP 12 determines whether a mode is the automatic mode. For example, when it is determined in step S61 that the mode is the automatic mode, the processing goes to step S62.

In step S62, the system control unit 143 measures current ISO sensitivity setting. The ISO sensitivity may be a value set previously by operation of the operation unit (not illustrated) or may be measured or calculated according to illuminance or diaphragm.

In step S63, the system control unit 143 sets a compression rate in an image data format to set image quality corresponding to ISO sensitivity. Here, as the ISO sensitivity becomes higher, influence from a noise is received more. Thus, the system control unit 143 performs setting in such a manner that the compression rate in the image data format is decreased as the ISO sensitivity becomes higher. Inversely, as the ISO sensitivity becomes lower, an influence from a noise becomes small. Thus, the system control unit 143 performs setting in such a manner that the compression rate in the pixel data format is increased as the ISO sensitivity becomes lower. The system control unit 143 stores set information into the register 142 thereof.

In step S64, the system control unit 143 communicates with the system control unit 51 of the image sensor 11 by serial communication and supplies the set information. By this processing, the system control unit 51 of the image sensor 11 stores the set information into the register 53.

On the other hand, when it is determined in step S61 that the mode is not the automatic mode, it is determined that the mode is the manual mode. Then, the processing goes to step S65.

In step S65, the system control unit 143 reads operation contents indicating information of a compression rate set with the operation button (not illustrated) or the like.

In step S66, based on information corresponding to the operation contents of the operation button, the system control unit 143 sets a compression rate and the processing goes to step S64.

By the above processing, information of a compression rate in the pixel data format which rate determines image quality is set and it becomes possible to realize the above-described data transmission processing and data reception processing at the set compression rate in the pixel data format. As a result, it becomes possible to adequately set, by an existing interface, a compression rate in the pixel data format with respect to image quality corresponding to an intension of a user or image quality corresponding to ISO sensitivity or the like.

Incidentally, the series of above-described processing can be executed by hardware or by software. In a case where the series of processing is executed by the software, when installation of a computer or various programs embedded in special hardware is performed, a program included in the software is installed from a recording medium, for example, into a general personal computer which can execute various functions.

Figure 22:
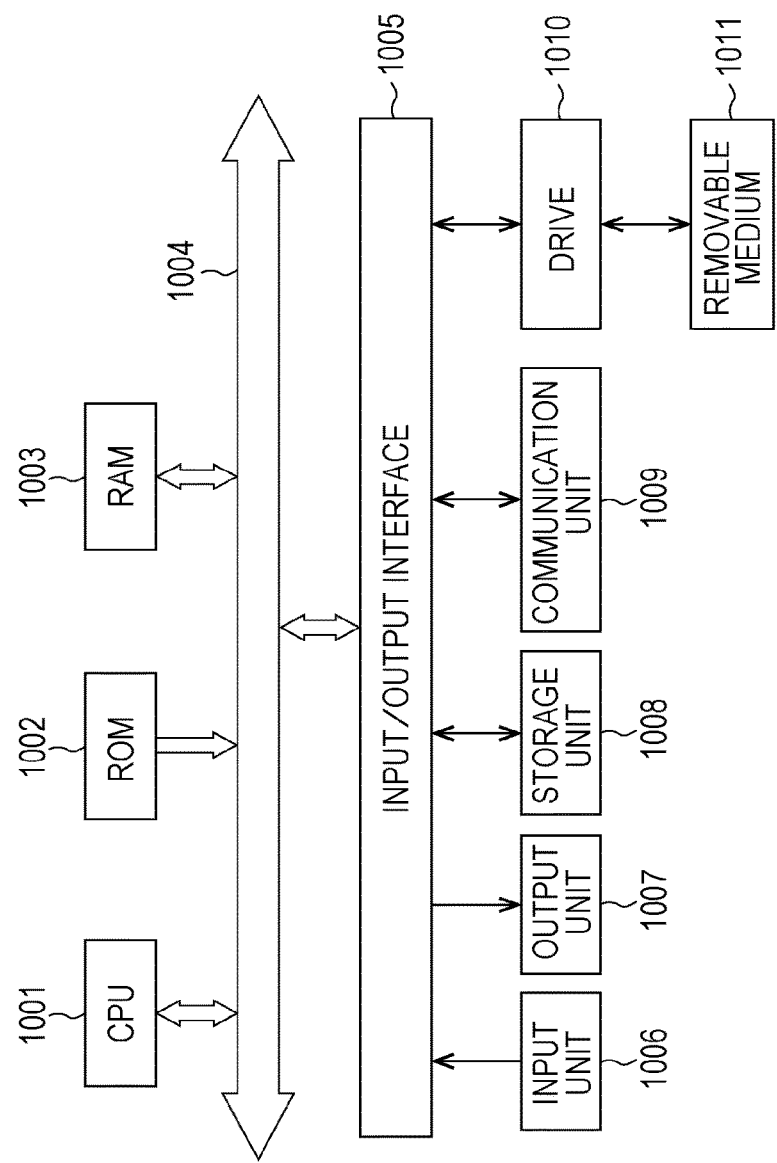
FIG. 22 is a view for describing a configuration example of a general personal computer.

FIG. 22 is a view illustrating a configuration example of a general personal computer. The personal computer includes a central processing unit (CPU) 1001. To the CPU 1001, an input/output interface 1005 is connected through a bus 1004. To the bus 1004, a read only memory (ROM) 1002 and a random access memory (RAM) 1003 are connected.

To the input/output interface 1005, an input unit 1006 including an input device such as a keyboard or a mouse with which a user inputs an operation command, an output unit 1007 to output an image such as a processing operation screen or a processing result onto a display device, a storage unit 1008 including a hard disk drive or the like to store a program or various kinds of data, and a communication unit 1009 which includes a local area network (LAN) adapter or the like and which executes communication processing through a network such as the Internet are connected. Also, to a removable medium 1011 such as a magnetic disk (including flexible disk), optical disk (including compact disc-read only memory (CD-ROM) and digital versatile disc (DVD)), a magneto optical disk (including mini disc (MD)), or a semiconductor memory, a drive 1010 to read/write data is connected.

The CPU 1001 executes various kinds of processing according to a program stored in the ROM 1002 or a program which is read from the removable medium 1011 such as a magnetic disk, an optical disk, a magneto optical disk, or a semiconductor memory, installed into the storage unit 1008, and loaded from the storage unit 1008 into the RAM 1003. In the RAM 1003, data or the like necessary for the CPU 1001 to execute various kinds of processing is also stored arbitrarily.

In the computer configured in the above-described manner, the CPU 1001 loads, for example, a program stored in the storage unit 1008 into the RAM 1003 through the input/output interface 1005 and the bus 1004 and executes the program, whereby the series of processing is performed.

For example, the program executed by the computer (CPU 1001) may be recorded in the removable medium 1011, which functions as a package medium or the like, when being provided. Also, the program can be provided through a wired or wireless transmission medium such as a local area network, the Internet, or a digital satellite broadcast.

In the computer, by mounting the removable medium 1011 to the drive 1010, the program can be installed into the storage unit 1008 through the input/output interface 1005. Also, the program can be received in the communication unit 1009 through the wired or wireless transmission medium and can be installed into the storage unit 1008. In addition, the program can be previously installed into the ROM 1002 or the storage unit 1008.

Note that the program executed by the computer may be a program in which processing is performed chronologically in an order described in the present description or may be a program in which processing is performed in parallel or at necessary timing such as when a call is performed.

Also, in the present description, a system means an aggregation of a plurality of components (apparatus, module (part), and the like) and it is not necessary whether all components are in the same housing. Thus, both of a plurality of apparatuses housed in different housings and connected to each other through a network and one apparatus in which a plurality of modules is housed in one housing are systems.

Note that an embodiment of the present technique is not limited to the above-described embodiments and various modifications can be made within the spirit and the scope of the present technique.

For example, the present technique may include a configuration of cloud computing in which one function is divided and shared by a plurality of apparatuses through a network when processed.

Also, each step described in the above flowchart can be executed not only by one apparatus but also by a plurality of apparatuses.

Moreover, when a plurality of kinds of processing is included in one step, the plurality of kinds of processing included in the one step can be executed not only by one apparatus but also by a plurality of apparatuses.

Note that the present technique may also include the following configuration.

(1) An image sensor including:
an imaging unit configured to image an original image;
a compression unit configured to compress a plurality of pieces of pixel data of the original image into a compression format; and
a conversion unit configured to convert a compression format of the plurality of pieces of pixel data of the original image into a transmission format of the plurality of pieces of pixel data.

(2) The image sensor according to (1), wherein
a bit length of the transmission format is different from a bit length of the compression format.

(3) The image sensor according to (1), wherein
a bit length of the transmission format is identical to a bit length of the compression format.

(4) The image sensor according to (1) to (3), wherein
the compression unit performs compression into the compression format in a unit of the plurality pieces of pixel data of the original image, and
the conversion unit converts the compression format which is compressed in the unit of the plurality of pieces of pixel data of the original image into the plurality of transmission formats.

(5) The image sensor according to (4), wherein
the conversion unit arranges virtual data into pixel data processed in the unit of the plurality of pieces of pixel data for matching with a block size when converting the compression format which is compressed in the unit of the plurality of pieces of pixel data of the original image into the plurality of transmission formats.

(6) The image sensor according to (1), further including a setting unit configured to set the a compression rate according to image quality of the original image, wherein
the compression unit compresses the plurality of pieces of pixel data of the original image into a compression format at the compression rate set by the setting unit.

(7) A data transmission method of an image sensor, including the steps of:
imaging an original image;
compressing a plurality of pieces of pixel data of the original image into a compression format; and
converting the compression format of the plurality of pieces of pixel data of the original image into a transmission format of the plurality of pieces of pixel data.

(8) A program for causing a computer to execute processing including:
an imaging step to image an original image;
a compression step to compress a plurality of pieces of pixel data of the original image into a compression format; and
a conversion step to convert the compression format of the plurality of pieces of pixel data of the original image into a transmission format of the plurality of pieces of pixel data.

(9) An information processing apparatus including:
a decompression unit configured to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data; and
an expansion unit configured to expand the compression format decompressed by the decompression unit into the plurality of pieces of pixel data of the original image.

(10) The information processing apparatus according to (9), wherein
a bit length of the transmission format is different from a bit length of the compression format.

(11) The information processing apparatus according to (9), wherein
a bit length of the transmission format is identical to a bit length of the compression format.

(12) The information processing apparatus according to any of (9) to (11), wherein
the decompression unit decompresses the plurality of transmission formats into the compression format in a unit of the plurality of pieces of pixel data of the original image, and
the expansion unit expands the compression format compressed in the unit of the plurality of pieces of pixel data of the original image into the plurality of pieces of pixel data.

(13) The information processing apparatus according to (9), further including a setting unit configured to set a compression rate according to image quality of the original image, wherein
the expansion unit expands the compression format into the plurality of pieces of pixel data of the original image based on the compression rate set by the setting unit.

(14) An information processing method including the steps of:
decompressing a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data; and
expanding the decompressed compression format into the plurality of pieces of pixel data of the original image.

(15) A program for causing a computer to execute processing including a decompression step to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data, and an expansion step to expand the compression format, which is decompressed by the processing in the decompression step, into the plurality of pieces of pixel data of the original image.

(16) An electronic device including:
an imaging unit configured to image an original image;
a compression unit configured to compress a plurality of pieces of pixel data of the original image into a compression format; and
a conversion unit configured to convert the compression format of the plurality of pieces of pixel data of the original image into a transmission format of the plurality of pieces of pixel data.

(17) An electronic device including:
a decompression unit configured to decompress a transmission format of a plurality of pieces of pixel data of an original image, which format is converted from a compression format of the plurality of pieces of pixel data of the original image into which compression format the plurality of pieces of pixel data of the original image is compressed, into the compression format of the plurality of pieces of pixel data; and
an expansion unit configured to expand the compression format decompressed by the decompression unit into the plurality of pieces of pixel data of the original image.

REFERENCE SIGNS LIST 1 transmission system
11 image sensor
12 DSP
21 imaging unit
22 transmission unit
31 reception unit
32 image processing unit
51 system control unit
53 register
54 compression unit
62 conversion unit
63 payload ECC insertion unit
64 packet generation unit
65 Lane distribution unit
72 header generation unit
83-0 to 83-N signal processing unit
91 control code insertion unit
92 8B10B symbol encoder
93 synchronization unit
94 transmission unit
102-0 to 102-N signal processing unit
111 reception unit
112 clock generation unit
113 synchronization unit
114 symbol synchronization unit
115 10B8B symbol decoder
116 skew correction unit
117 control code removing unit
122 Lane integration unit
123 packet separation unit
124 payload error correction unit
125 conversion unit
132 header error correction unit
142 register
143 system control unit
144 expansion unit

The invention claimed is:
1. An imaging apparatus, comprising:
an image sensor configured to acquire an image; and
circuitry configured to:
compress a plurality of pieces of pixel data of the image into compressed data;
convert the compressed data into a plurality of packets of data,
wherein each packet of data of the plurality of packets of data comprises at least a header and pixel data,
wherein the header comprises a plurality of pairs of information, and
wherein each pair of information of the plurality of pairs of information comprises header information and a cyclic redundancy check (CRC) code;
calculate an error correction code for correction in the pixel data;
insert a parity in the pixel data, wherein the parity corresponds to the calculated error correction code; and
arrange virtual data into the pixel data in a unit of the plurality of pieces of pixel data to match a block size upon conversion of the compressed data to the plurality of packets of data.

2. The imaging apparatus according to claim 1, wherein a bit length of each packet of data of the plurality of packets of data is different from a bit length of the compressed data.

3. The imaging apparatus according to claim 1, wherein a bit length of each packet of data of the plurality of packets of data is identical to a bit length of the compressed data.

4. The imaging apparatus according to claim 1, wherein the circuitry is further configured to:
set a compression rate based on an image quality of the image; and
compress the plurality of pieces of pixel data of the image into the compressed data based on the set compression rate.

5. A data transmission method of an image sensor, comprising:
acquiring an image;
compressing a plurality of pieces of pixel data of the image into compressed data;
converting the compressed data of the plurality of pieces of pixel data of the image into a plurality of packets of data,
wherein each packet of data of the plurality of packets of data comprises at least a header and pixel data,
wherein the header comprises a plurality of pairs of information, and
wherein each pair of information of the plurality of pairs of information comprises header information and a cyclic redundancy check (CRC) code;
calculating an error correction code for correction in the pixel data;
inserting a parity in the pixel data, wherein the parity corresponds to the calculated error correction code; and
arranging virtual data into the pixel data in a unit of the plurality of pieces of pixel data to match a block size upon conversion of the compressed data to the plurality of packets of data.

6. A non-transitory computer-readable medium having stored thereon computer-readable instructions, which when executed by a processor, cause the processor to execute operations, the operations comprising:
acquiring an image;
compressing a plurality of pieces of pixel data of the image into compressed data;
converting the compressed data of the plurality of pieces of pixel data of the image into a plurality of packets of data,
wherein each packet of data of the plurality of packets of data comprises at least a header and pixel data,
wherein the header comprises a plurality of pairs of information, and
wherein each pair of information of the plurality of pairs of information comprises header information and a cyclic redundancy check (CRC) code;
calculating an error correction code for correction in the pixel data;
inserting a parity in the pixel data, wherein the parity corresponds to the calculated error correction code; and
arranging virtual data into the pixel data in a unit of the plurality of pieces of pixel data to match a block size upon conversion of the compressed data to the plurality of packets of data.

7. An information processing apparatus, comprising:
at least one processor configured to:
convert a plurality of packets of data of a plurality of pieces of pixel data into compressed data compressed in a unit of the plurality of pieces of pixel data of an image,
wherein each packet of data of the plurality of packets of data comprises at least a header and pixel data,
wherein a parity is inserted in the pixel data, wherein the parity corresponds to an error correction code,
wherein the header comprises a plurality of pairs of information,
wherein each pair of information of the plurality of pairs of information comprises header information and a cyclic redundancy check (CRC) code,
wherein the plurality of packets of data is converted from the compressed data compressed in the unit of the plurality of pieces of pixel data of the image, and
wherein virtual data is arranged into the pixel data in the unit of the plurality of pieces of pixel data to match a block size upon conversion of the compressed data to the plurality of packets of data; and
expand the compressed data into the plurality of pieces of pixel data of the image.

8. The information processing apparatus according to claim 7, wherein a bit length of each packet of data of the plurality of packets of data is different from a bit length of the compressed data.

9. The information processing apparatus according to claim 7, wherein a bit length of each packet of data of the plurality of packets of data is identical to a bit length of the compressed data.

10. The information processing apparatus according to claim 7, wherein the at least one processor is further configured to:
set a compression rate based on an image quality of the image; and
expand the compressed data into the plurality of pieces of pixel data of the image based on the set compression rate.

11. An information processing method, comprising:
converting a plurality of packets of data of a plurality of pieces of pixel data into compressed data compressed in a unit of the plurality of pieces of pixel data of an image,
wherein each packet of data of the plurality of packets of data comprises at least a header and pixel data,
wherein a parity is inserted in the pixel data, wherein the parity corresponds to an error correction code,
wherein the header comprises a plurality of pairs of information,
wherein each pair of information of the plurality of pairs of information comprises header information and a cyclic redundancy check (CRC) code,
wherein each packet of data of the plurality of packets of data is converted from the compressed data compressed in the unit of the plurality of pieces of pixel data of the image, and
wherein virtual data is arranged into the pixel data in the unit of the plurality of pieces of pixel data to match a block size upon conversion of the compressed data to the plurality of packets of data; and
expanding the compressed data into the plurality of pieces of pixel data of the image.

12. A non-transitory computer-readable medium having stored thereon computer-readable instructions, which when executed by a processor, cause the processor to execute operations, the operations comprising:
- converting a plurality of packets of data of a plurality of pieces of pixel data into compressed data compressed in a unit of the plurality of pieces of pixel data of an image,
  - wherein each packet of data of the plurality of packets of data comprises at least a header and pixel data,
  - wherein a parity is inserted in the pixel data, wherein the parity corresponds to an error correction code,
  - wherein the header comprises a plurality of pairs of information,
  - wherein each pair of information of the plurality of pairs of information comprises header information and a cyclic redundancy check (CRC) code,
  - wherein each packet of data of the plurality of packets of data is converted from the compressed data compressed in the unit of the plurality of pieces of pixel data of the image, and
  - wherein virtual data is arranged into the pixel data in the unit of the plurality of pieces of pixel data to match a block size upon conversion of the compressed data to the plurality of packets of data; and
- expanding the compressed data into the plurality of pieces of pixel data of the image.

* * * * *